United States Patent
Viswanatha

(10) Patent No.: US 9,575,905 B2
(45) Date of Patent: Feb. 21, 2017

(54) STORAGE CONTROLLER CACHE SYNCHRONIZATION METHOD AND APPARATUS

(71) Applicant: Seagate Technology LLC, Cupertino, CA (US)

(72) Inventor: Ritvik Viswanatha, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/195,804

(22) Filed: Jun. 28, 2016

(65) Prior Publication Data

US 2016/0306753 A1 Oct. 20, 2016

Related U.S. Application Data

(63) Continuation of application No. 14/196,470, filed on Mar. 4, 2014, now Pat. No. 9,378,145.

(60) Provisional application No. 61/772,656, filed on Mar. 5, 2013.

(51) Int. Cl.
*G06F 12/14* (2006.01)
*G06F 3/06* (2006.01)
*G06F 12/08* (2016.01)
*G06F 11/20* (2006.01)

(52) U.S. Cl.
CPC ......... *G06F 12/1458* (2013.01); *G06F 3/0617* (2013.01); *G06F 3/0622* (2013.01); *G06F 3/0637* (2013.01); *G06F 3/0673* (2013.01); *G06F 11/2092* (2013.01); *G06F 12/0802* (2013.01); *G06F 2201/805* (2013.01); *G06F 2212/1052* (2013.01); *G06F 2212/60* (2013.01)

(58) Field of Classification Search
None
See application file for complete search history.

(56) References Cited

U.S. PATENT DOCUMENTS

| 5,894,485 A * | 4/1999 | Halligan | G06F 3/0623 714/807 |
|---|---|---|---|
| 2012/0102268 A1* | 4/2012 | Smith | G06F 11/2089 711/113 |
| 2012/0260127 A1* | 10/2012 | Jibbe | G06F 11/2092 714/6.21 |

OTHER PUBLICATIONS

Compaq Storageworks RAID Array 3000 Controller Shelf Hardware Users Guide, EK-SMCPQ-UG.001, 1999.

* cited by examiner

*Primary Examiner* — Reginald Bragdon
*Assistant Examiner* — James J Thomas
(74) *Attorney, Agent, or Firm* — Thomas J. Lavan

(57) ABSTRACT

A storage controller is provided. The storage controller includes a memory storing an indication of a current owner, a previous owner, and a preferred owner for each of one or more logical volumes. The storage controller is configured to write protect the logical volumes where the current owner and the preferred owner is the storage controller and the previous owner of the logical volumes was a different storage controller. For the logical volumes where the storage controller is the preferred but not the current owner, the storage controller is set as the current and preferred owner of the logical volumes that the different storage controller was the current but not the preferred owner for, storage controller is set as the previous owner of the logical volumes that the storage controller is the current and preferred owner of, and allowing read and write access to the one or more logical volumes.

20 Claims, 17 Drawing Sheets

Regular failover process

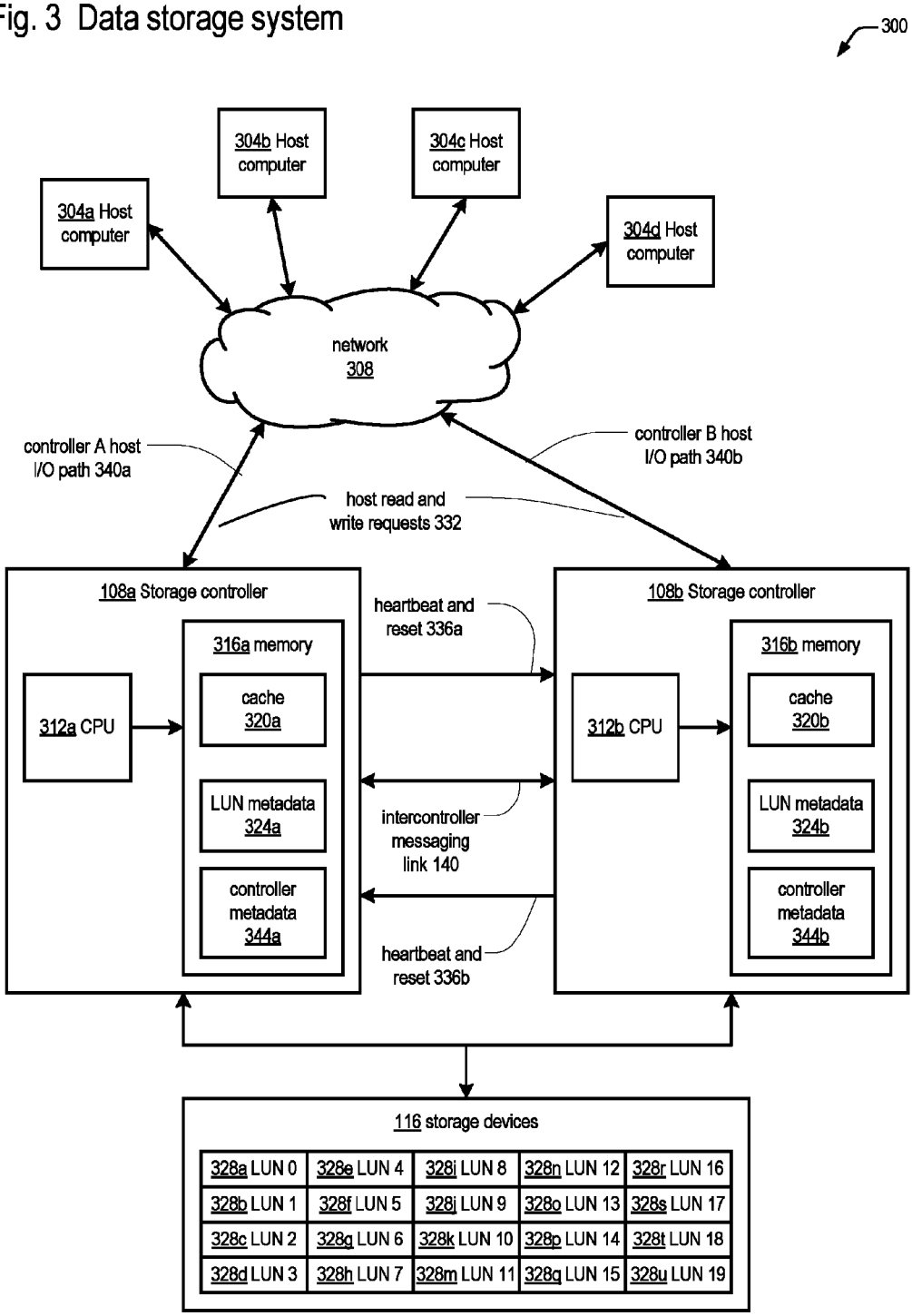
Fig. 3 Data storage system

Fig. 4a  LUN metadata  ⟵ 324

| 328 LUN # | 408 current owner | 412 preferred owner ID | 416 previous owner | 420 write protected | 424 clean shutdown |
|---|---|---|---|---|---|
| 328a LUN 0 | controller A S/N | slot A ID | controller A S/N | No | Yes |
| 328b LUN 1 | controller A S/N | slot A ID | controller C S/N | No | Yes |
| 328c LUN 2 | controller B S/N | slot B ID | controller B S/N | No | No |
| ⋮ | ⋮ | ⋮ | ⋮ | ⋮ | ⋮ |
| 328x LUN x | controller A S/N | slot A ID | controller A S/N | No | Yes |
| 328y LUN y | controller B S/N | slot B ID | controller B S/N | No | Yes |
| 328z LUN z | controller A S/N | slot A ID | controller A S/N | No | Yes |

Fig. 4b  Controller metadata  ⟵ 344

| 428 controller status |
|---|
| 428a controller A (normal, failed, booting) |
| 428b controller B (normal, failed, booting) |

| 432 controller serial numbers |
|---|
| 432a controller A serial number |
| 432b controller B serial number |

| 436 controller failover/failback scheduling |
|---|
| 436a controller failover on boot scheduled |
| 436b controller regular failover scheduled |
| 436c controller failback scheduled |

Fig. 5a  Normal storage controller operation
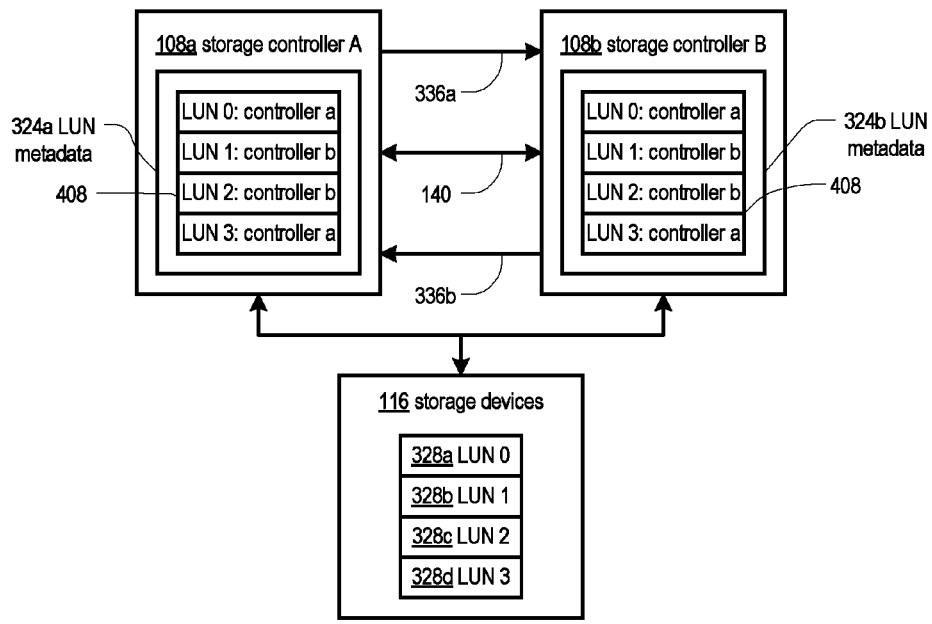
Fig. 5b  Storage controller B failure
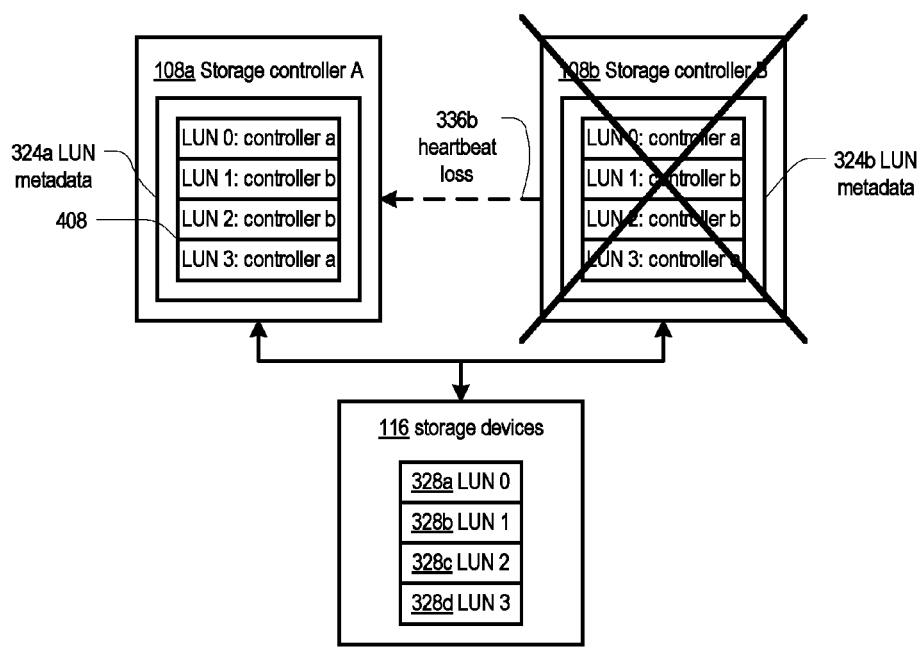

Fig. 5c Storage controller B failover
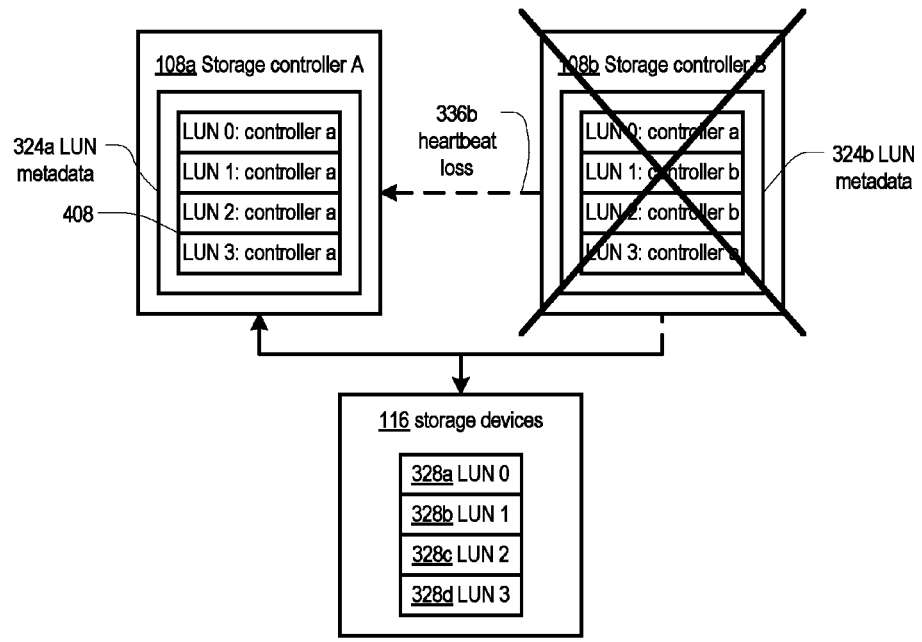
Fig. 5d Storage controller B failback
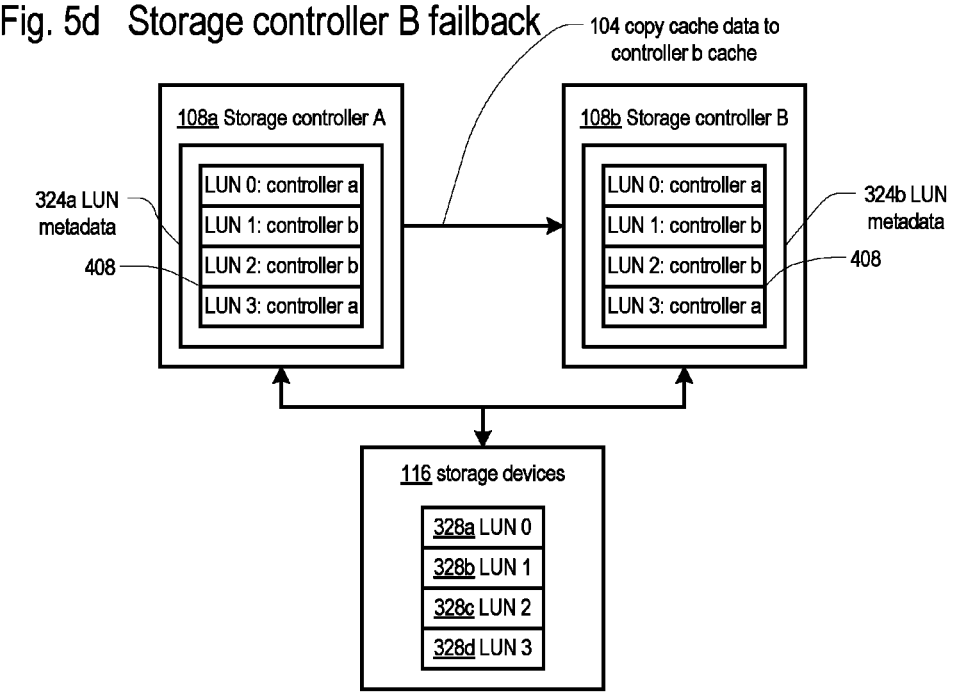

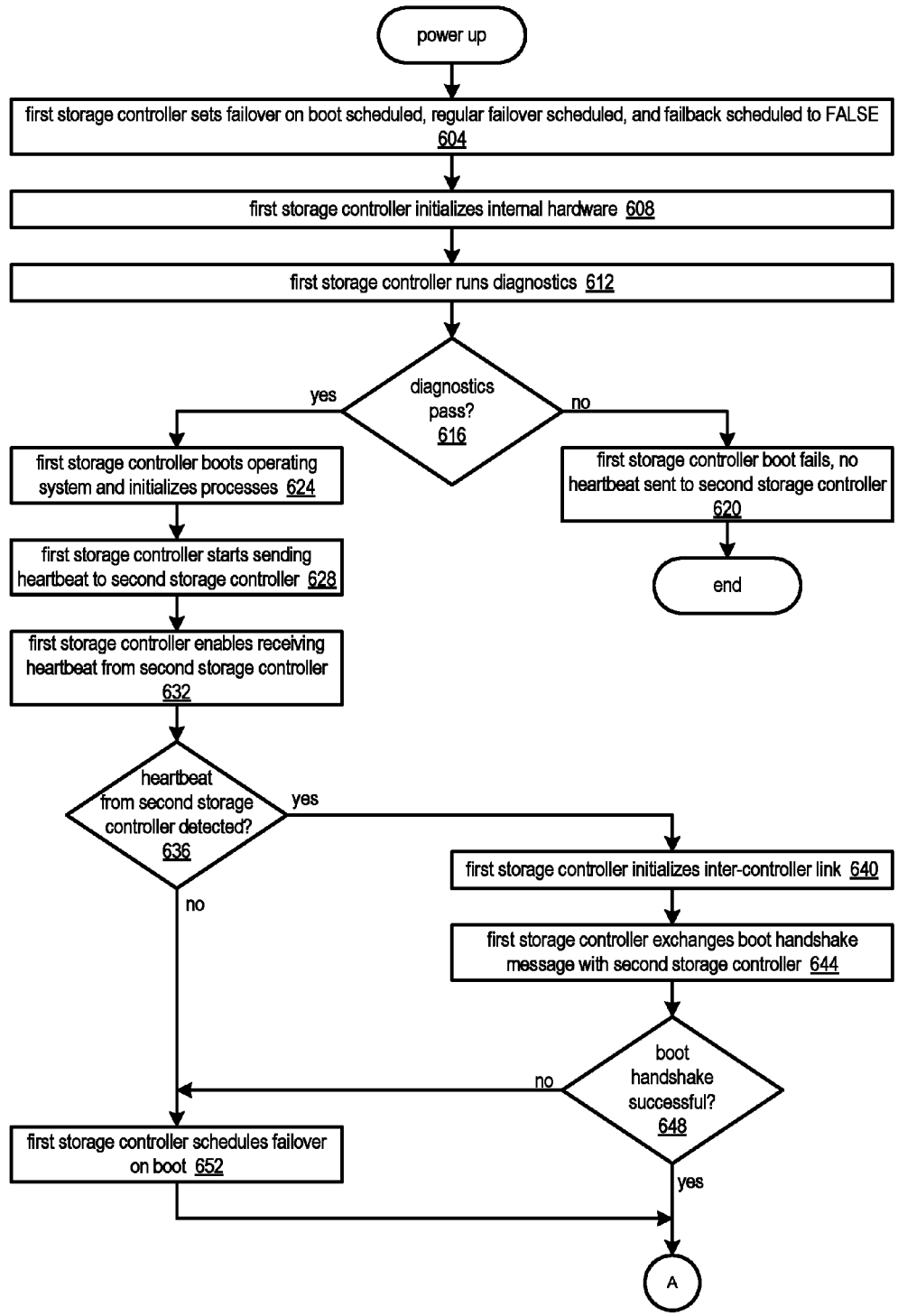
Fig. 6a Single controller boot process

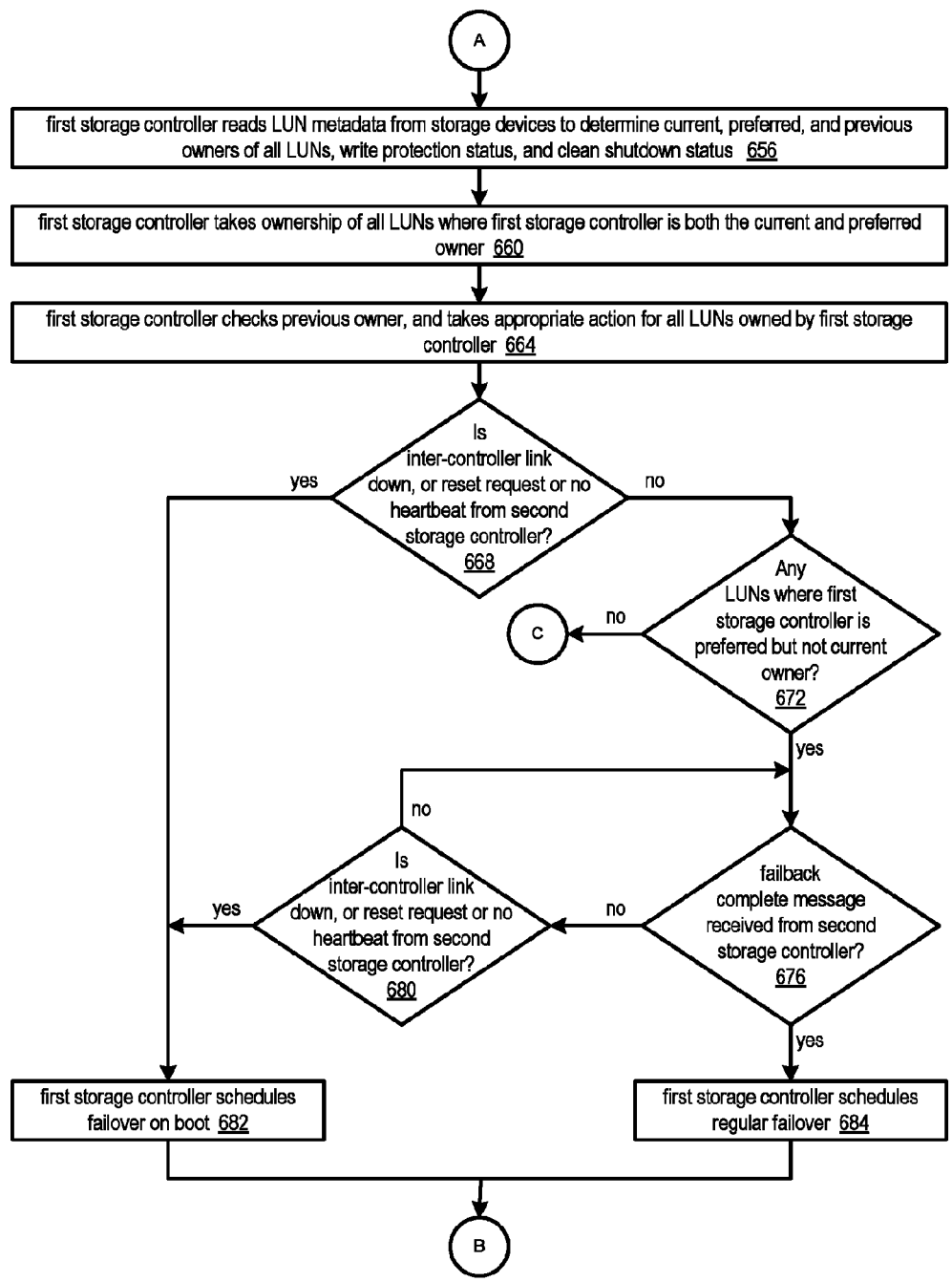
Fig. 6b Single controller boot process (continued)

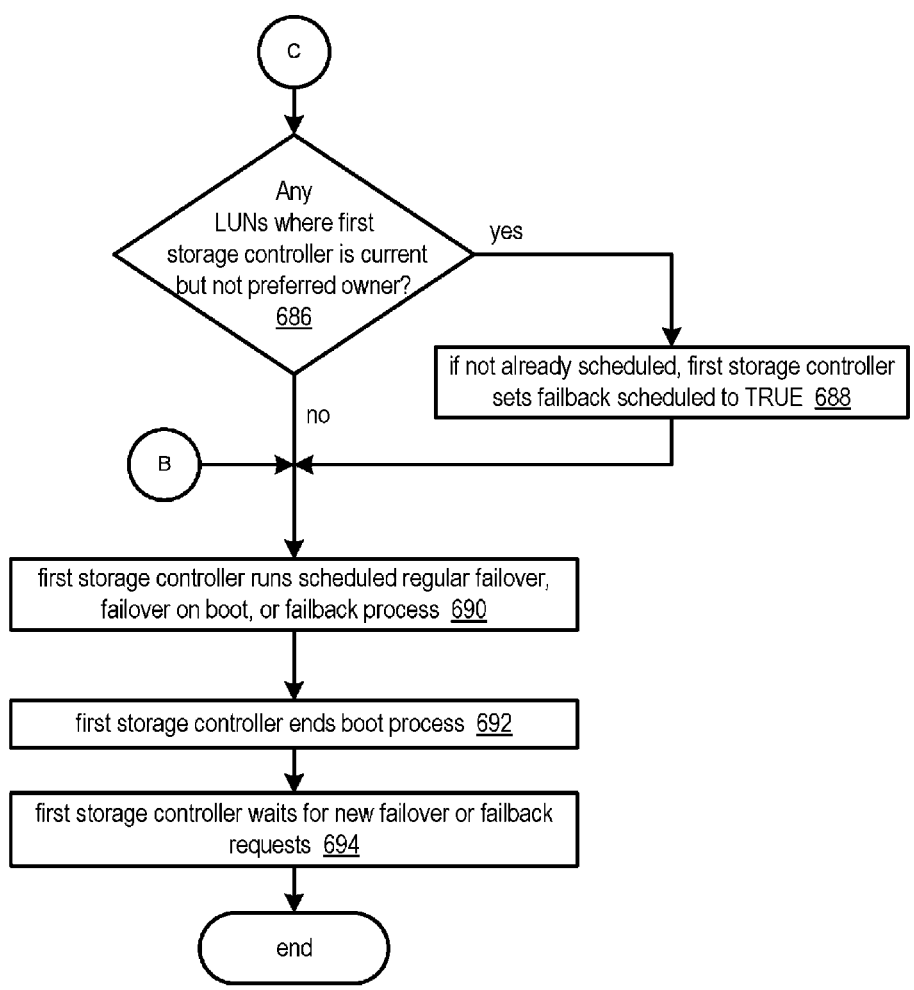
Fig. 6c Single controller boot process (continued)

Fig. 7 Schedule failover on boot
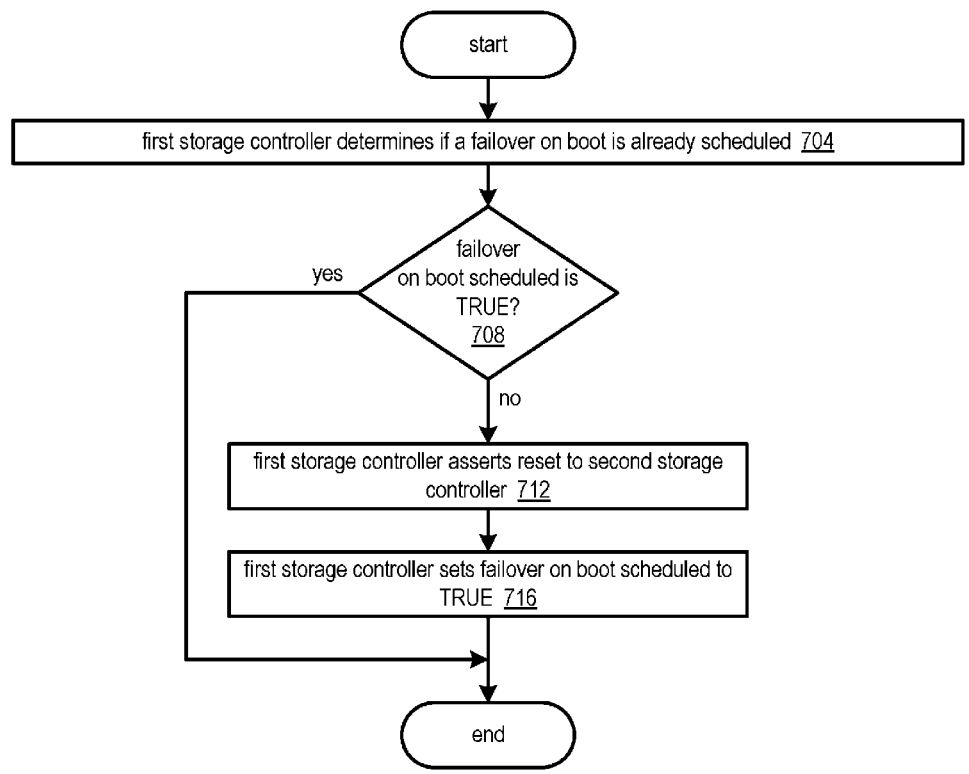

Fig. 8  Storage controller action process based on checking previous owner
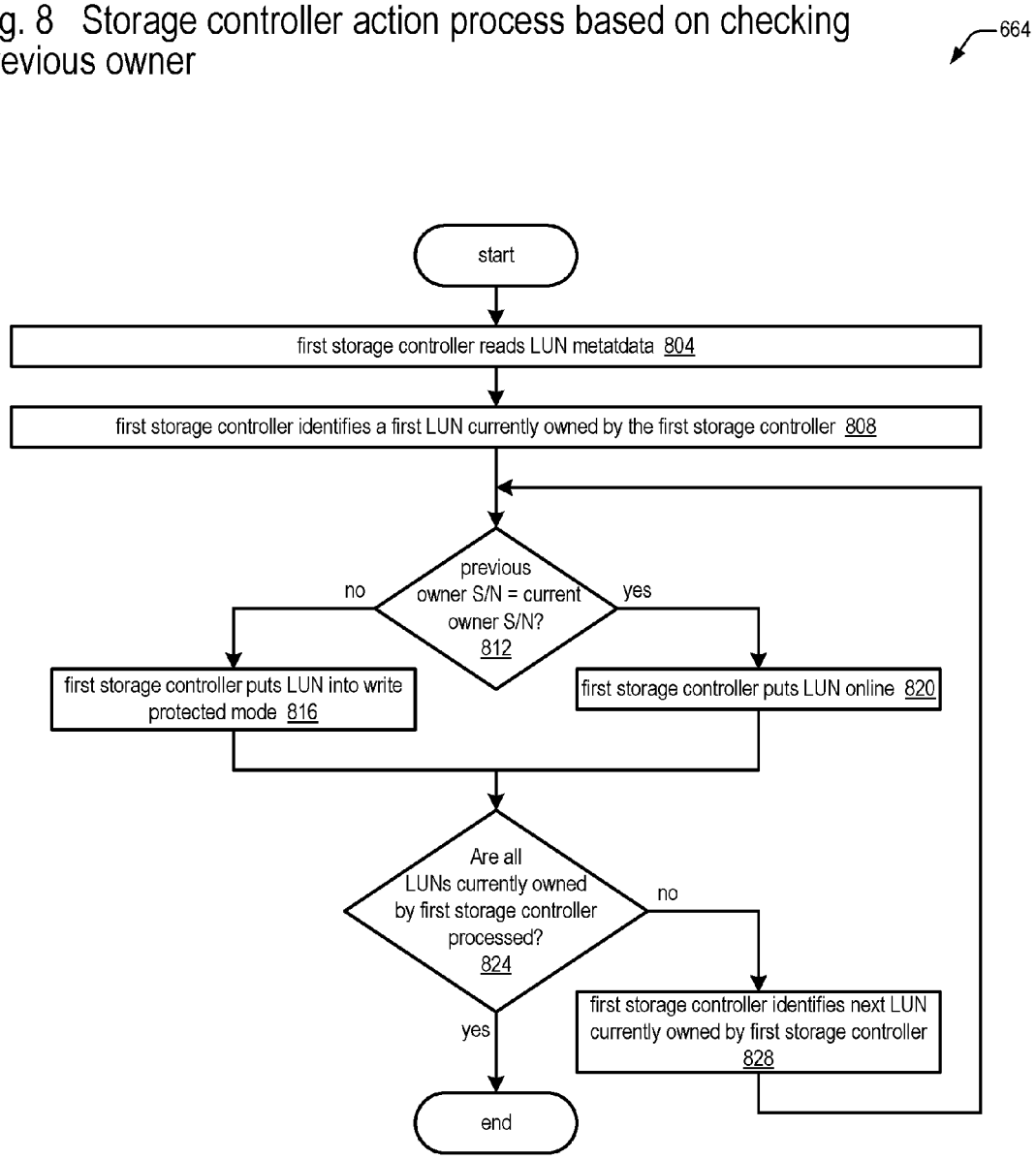

Fig. 9 Schedule regular failover
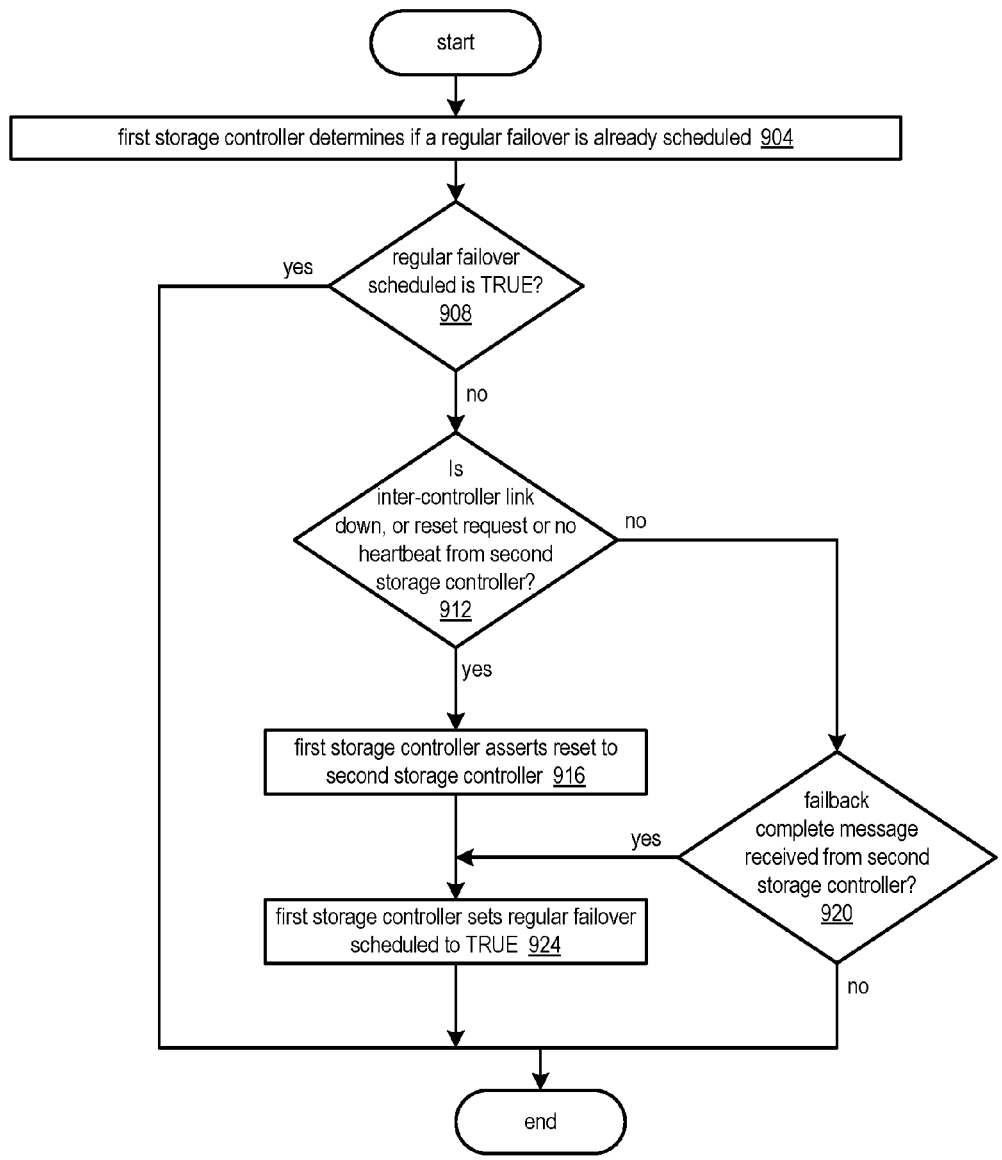

Fig. 10 Regular failover process
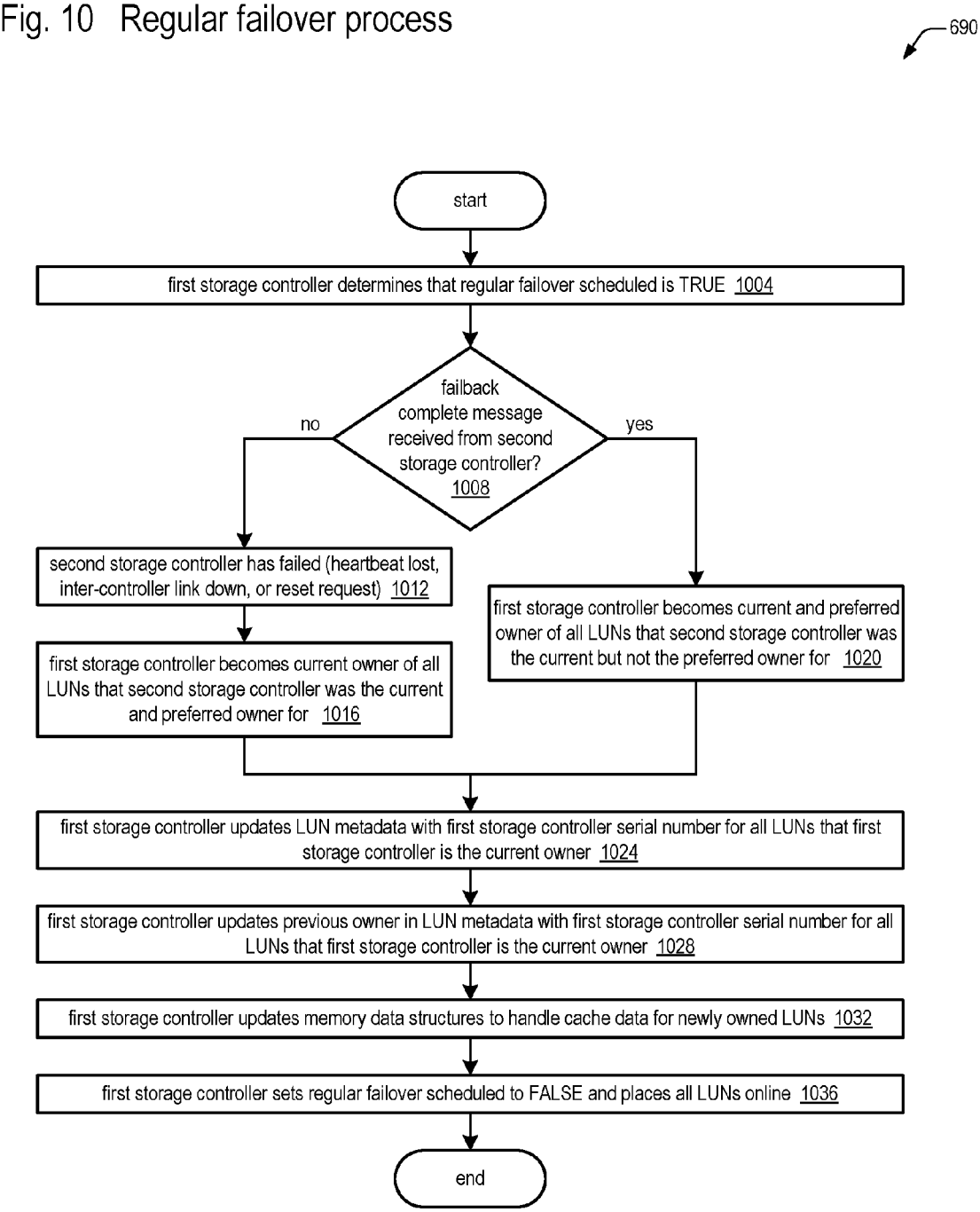

Fig. 11a Failover on boot process
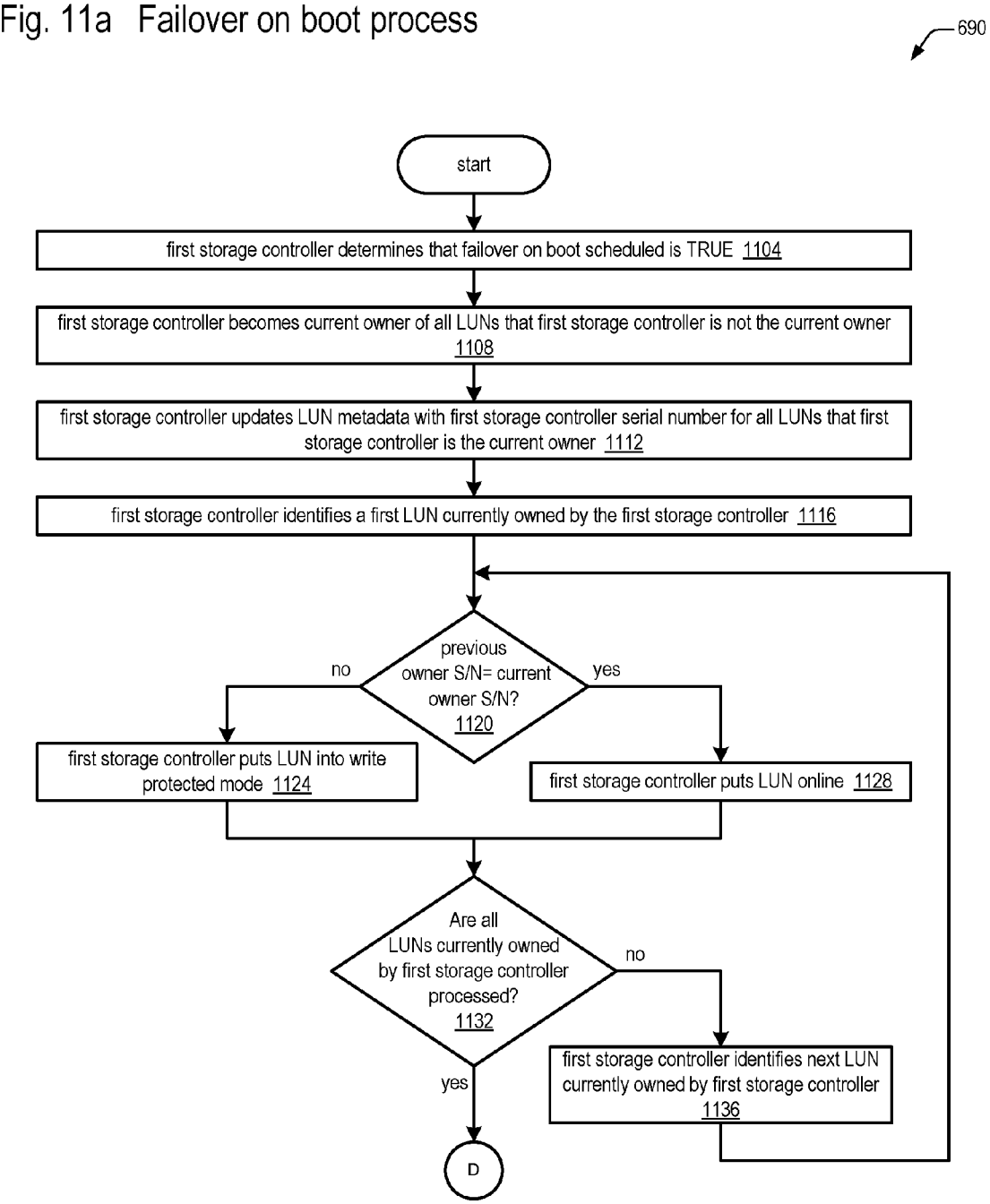

Fig. 11b Failover on boot process (cont'd)
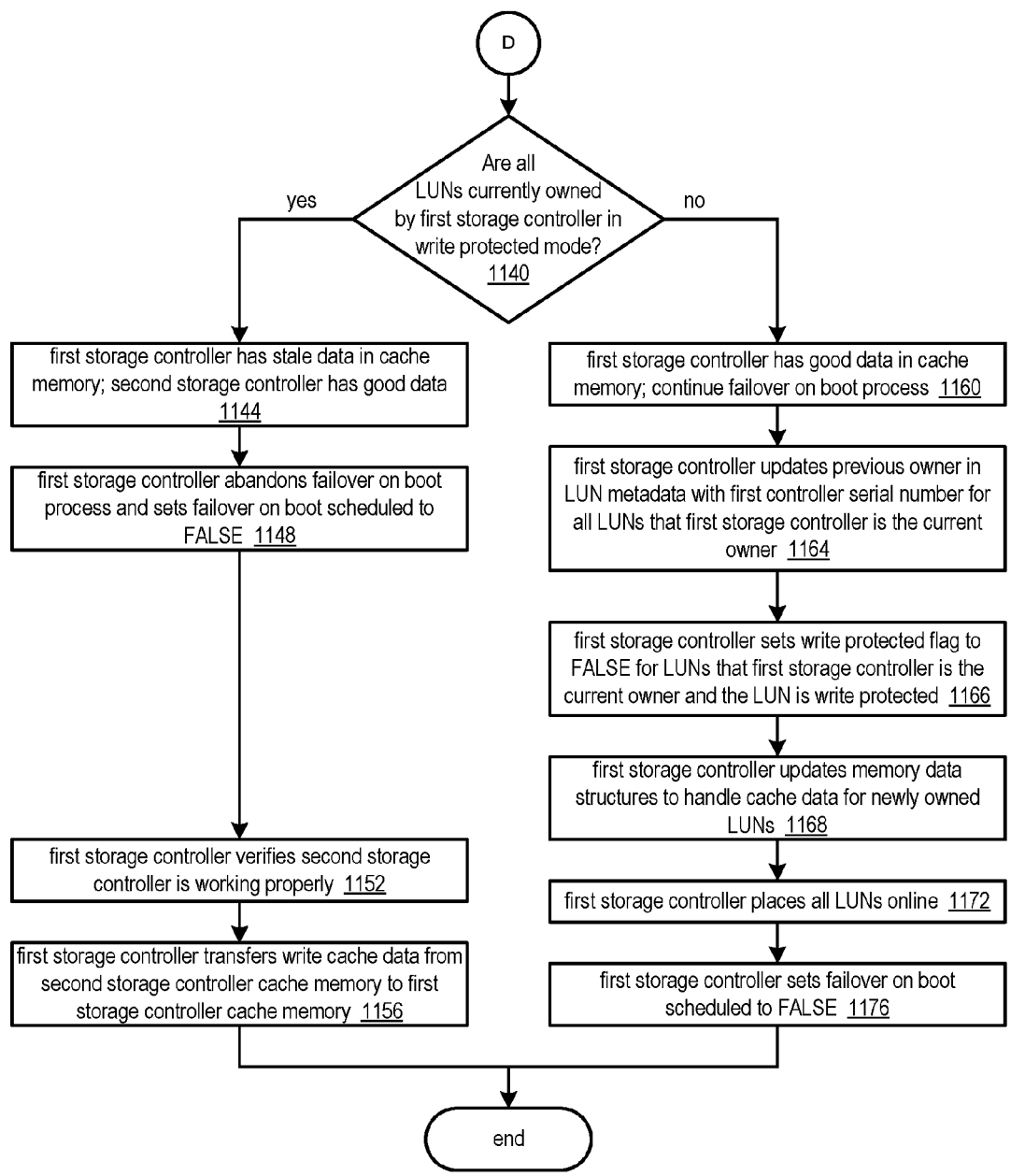

Fig. 12 Failback process
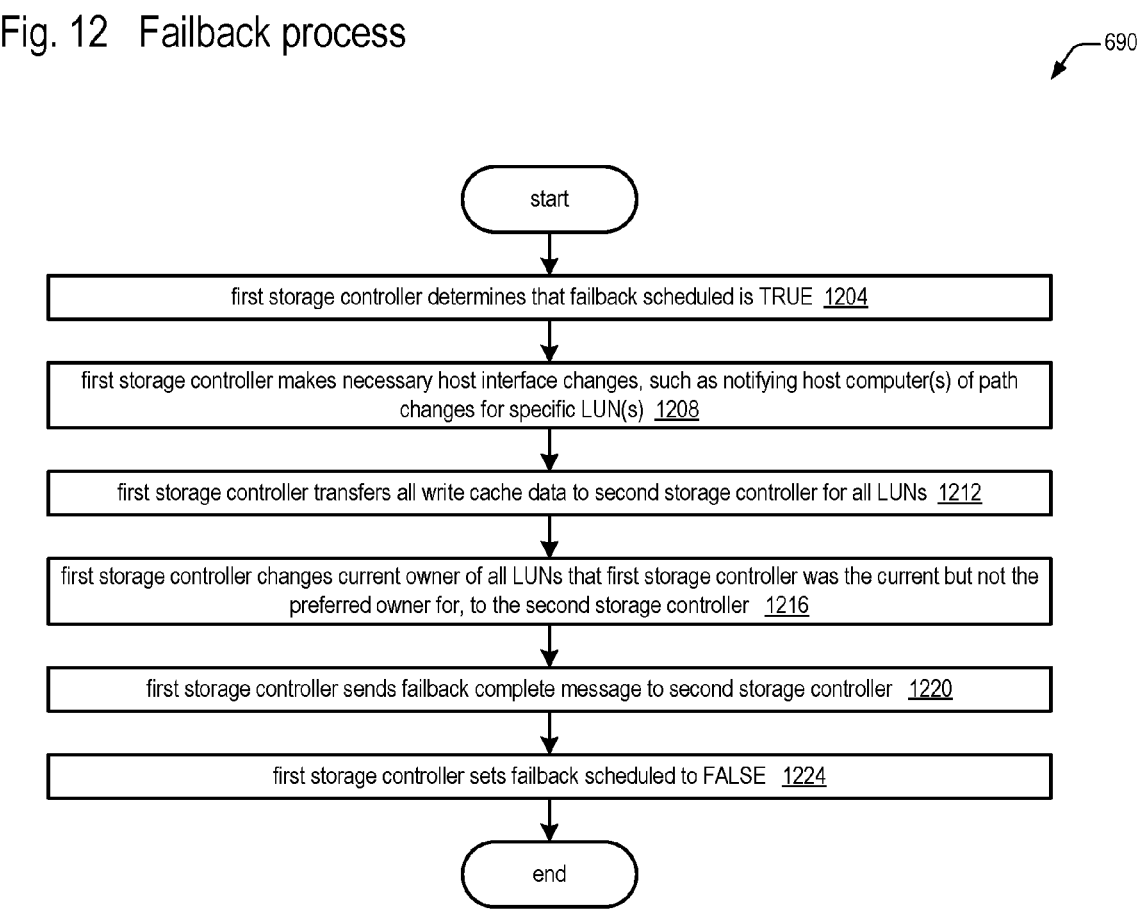

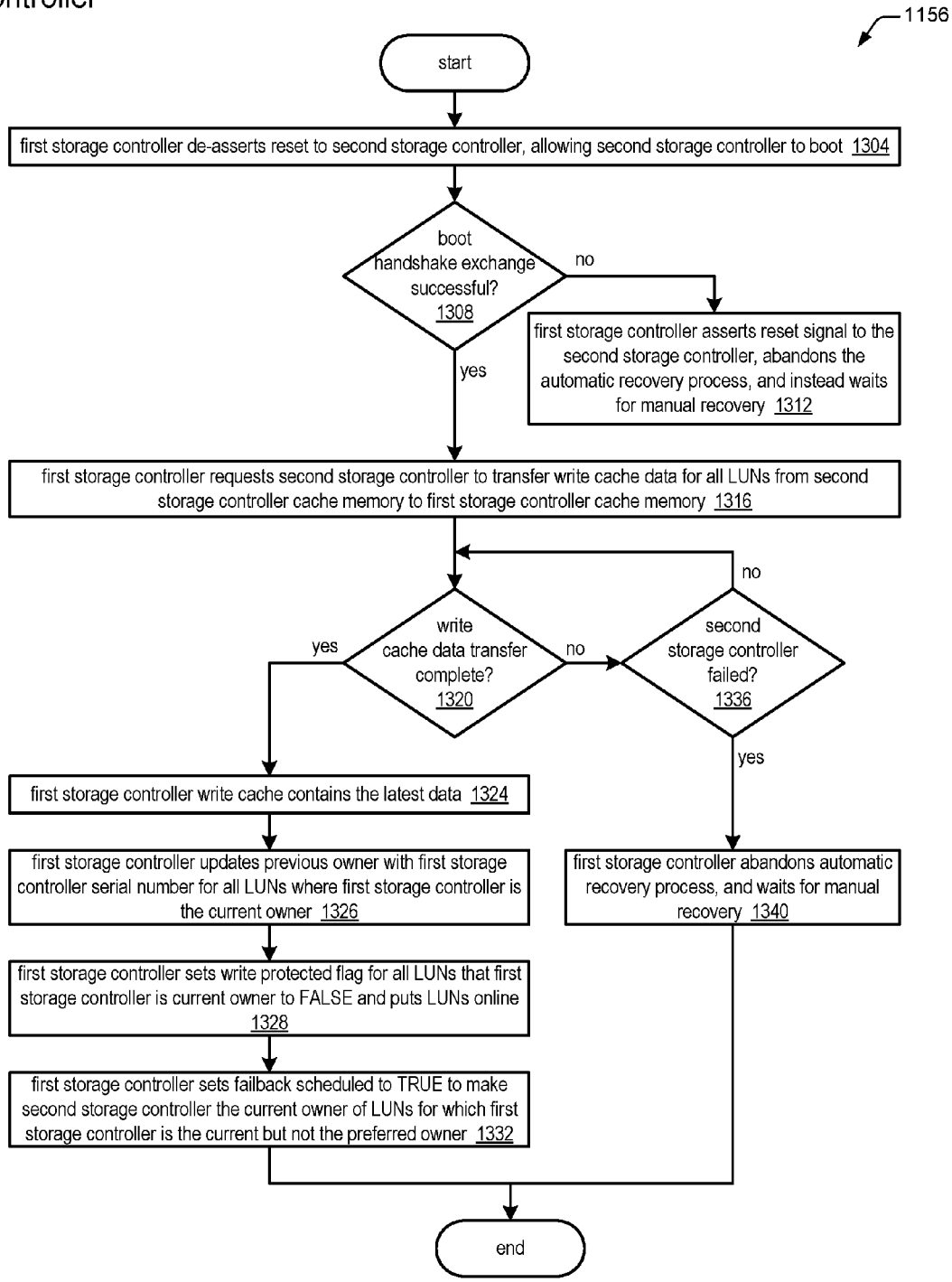
Fig. 13 Data recovery process to obtain good data from second storage controller

STORAGE CONTROLLER CACHE SYNCHRONIZATION METHOD AND APPARATUS

CROSS REFERENCE TO RELATED APPLICATIONS

This application is a continuation of application Ser. No. 14/196,470 filed Mar. 4, 2014, entitled STORAGE CONTROLLER CACHE SYNCHRONIZATION METHOD AND APPARATUS, which is hereby incorporated by reference for all purposes and which claims the benefit of U.S. Provisional Application Ser. No. 61/772,656 filed Mar. 5, 2013.

FIELD

The present invention is directed to computer data storage. In particular, the present invention is directed to methods and apparatuses for reliable cache synchronization by redundant storage controllers.

BACKGROUND

The need to store digital files, documents, pictures, images and other data continues to increase rapidly. In connection with the electronic storage of data, systems incorporating one or more data storage controllers have been devised. Storage controllers receive data read and write requests from host computers and control one or more physical storage devices to beneficially store or provide the requested data from/to the host computers.

In order to improve read and write performance, storage controllers often have cache memories. Cache memories provide temporary storage for frequently or recently accessed data in order to reduce average access time to data stored on storage devices controlled by storage controllers. Cache memories are typically much faster to access than storage devices, and do not incur the many latencies of preparing storage device commands, identifying the physical location(s) to access, and going through a storage device bus or network interconnect system.

Data writes to storage devices may be cached, or not. In a write through cache, every write to the cache also causes a corresponding write to the storage devices. Therefore, the data in the cache is always good since it is consistent with what has been stored to the storage devices. However, write through caches can limit write performance since a command completion is not sent to the host computer generating the write request until the data has been safely written to the slower storage devices.

Write performance to storage devices can be improved over write through performance by using a write back or copy back cache memory to store posted write data. Posted writes are host writes that have been stored to a write back cache, but have not yet been written to the storage devices. The storage controller generates a command completion to the host computer generating the write request after the data has been written to cache, but not yet written to the storage devices. Because the command completion is generated sooner than in the case of the write through cache, the host computer can issue a next data read or write request faster and throughput is thereby improved.

SUMMARY

The present invention is directed to solving disadvantages of the prior art. In accordance with embodiments of the present invention, a storage controller is provided. The storage controller includes a memory storing an indication of a current owner, a previous owner, and a preferred owner for each of one or more logical volumes. The storage controller is configured to write protect the logical volumes where the current owner and the preferred owner is the storage controller and the previous owner of the logical volumes was a different storage controller. For the logical volumes where the storage controller is the preferred but not the current owner, the storage controller is set as the current and preferred owner of the logical volumes that the different storage controller was the current but not the preferred owner for, storage controller is set as the previous owner of the logical volumes that the storage controller is the current and preferred owner of, and allowing read and write access to the one or more logical volumes.

In accordance with another embodiment of the present invention, a method is provided. The method includes write protecting, by a first storage controller, one or more-logical volumes if a previous owner of the one or more logical volumes was a second storage controller. For the one or more logical volumes where the first storage controller is a preferred owner but not a current owner: after receiving a notification from the second storage controller, the method includes becoming, by the first storage controller, the current and preferred owner of the one or more logical volumes that the second controller was the current but not the preferred owner for, becoming the previous owner of the one or more logical volumes that the first storage controller currently owns, and allowing read and write access to the one or more logical volumes by one or more host computers.

In accordance with another embodiment of the present invention, a system is provided. The system includes one or more logical volumes and first and second storage controllers coupled to the one or more logical volumes. Each storage controller is configured to: write protect logical volumes if a current owner and a preferred owner is one of the first and second storage controllers and a previous owner of the logical volumes is another of the first and second storage controllers. For logical volumes where one of the first and second storage controllers is a preferred owner but not a current owner: setting one of the first and second storage controllers as the current and preferred owner of the logical volumes that the other of the first and second controllers was the current but not the preferred owner for, becoming the previous owner of the logical volumes that the one of the first and second storage controllers currently owns, and allowing read and write access to the logical volumes.

An advantage of the present invention is it provides a method to guarantee good posted write data, regardless of the operating state of a pair of redundant storage controllers. During the boot process, the present invention takes into account the independent health of each of the pair of redundant storage controllers, and intercommunication paths between the pair of redundant storage controllers. The process of the present invention therefore does not rely on obtaining information from a partner storage controller in order to determine if the storage controller has reliable write back or posted write data in the storage controller cache memory.

Another advantage of the present invention is it does not rely on maintaining time stamps as to when the logical volume was last written. Additionally, no knowledge must be maintained of the time periods when the two storage controllers in a redundant storage system were operational, or failed, or shut down.

Yet another advantage of the present invention is that user data is protected even when storage controllers or storage devices are removed or swapped out of the storage system by mistake. The present invention maintains metadata including the previous owner for each logical volume to make sure that data reliability is not compromised by a previous storage controller removal or swap operation.

A further advantage of the present invention is that even if there is a failure on both storage controllers of a redundant storage controller pair, on a subsequent storage controller reboot each storage controller independently determines if the onboard write back or posted write data is reliable. In the event the data is not reliable, the storage controllers take steps to maintain data integrity and prevent data corruption.

Additional features and advantages of embodiments of the present invention will become more readily apparent from the following description, particularly when taken together with the accompanying drawings.

BRIEF DESCRIPTION OF THE DRAWINGS

FIG. 3 is a block diagram illustrating a data storage system in accordance with embodiments of the present invention.

FIG. 4a is a diagram illustrating LUN metadata in accordance with embodiments of the present invention.

FIG. 4b is a diagram illustrating controller metadata in accordance with embodiments of the present invention.

FIG. 5a is a block diagram illustrating normal storage controller operation in accordance with embodiments of the present invention.

FIG. 5b is a block diagram illustrating storage controller B failure in accordance with embodiments of the present invention.

FIG. 5c is a block diagram illustrating storage controller B failover in accordance with embodiments of the present invention.

FIG. 5d is a block diagram illustrating storage controller B failback in accordance with embodiments of the present invention.

FIG. 6a is a flowchart illustrating a first portion of a single controller boot process in accordance with embodiments of the present invention.

FIG. 6b is a flowchart illustrating a second portion of a single controller boot process in accordance with embodiments of the present invention.

FIG. 6c is a flowchart illustrating a third portion of a single controller boot process in accordance with embodiments of the present invention.

FIG. 7 is a flowchart illustrating a schedule failover on boot process in accordance with embodiments of the present invention.

FIG. 8 is a flowchart illustrating a storage controller action process based on checking a previous owner in accordance with embodiments of the present invention.

FIG. 9 is a flowchart illustrating a schedule regular failover process in accordance with embodiments of the present invention.

FIG. 10 is a flowchart illustrating a regular failover process in accordance with embodiments of the present invention.

FIG. 11a is a flowchart illustrating a first portion of a failover on boot process in accordance with embodiments of the present invention.

FIG. 11b is a flowchart illustrating a second portion of a failover on boot process in accordance with embodiments of the present invention.

FIG. 12 is a flowchart illustrating a failback process in accordance with embodiments of the present invention.

FIG. 13 is a flowchart illustrating a data recovery process to obtain good data from a second storage controller in accordance with embodiments of the present invention.

DETAILED DESCRIPTION

The present invention is directed to improvements to data reliability in a system employing redundant storage controllers that support posted writes. Redundant storage controllers are used in order to provide continuous data availability in the event of failure of a single storage controller. When a storage controller fails, the partner storage controller detects the failure and takes over the LUNs or logical volumes owned by the failed storage controller. The operation is referred to as failover. When the failed storage controller is fixed or replaced, the partner storage returns the LUNs or logical volumes previously owned by the storage controller. The operation is referred to as failback.

If both storage controllers of an active-active redundant pair fail, one after the other, the storage controller that failed last will have the most current data for all the LUNs in the system. The storage controller that failed first will have stale data for the LUNs in the system. If the storage controller that failed first boots up first or boots up with the partner controller failed, what is needed is a mechanism to recognize that a storage controller having stale data should not be written out to the storage devices, automatically bring up the storage controller that has the most current data, and obtain the current data after that controller boots up.

Figure 1A:
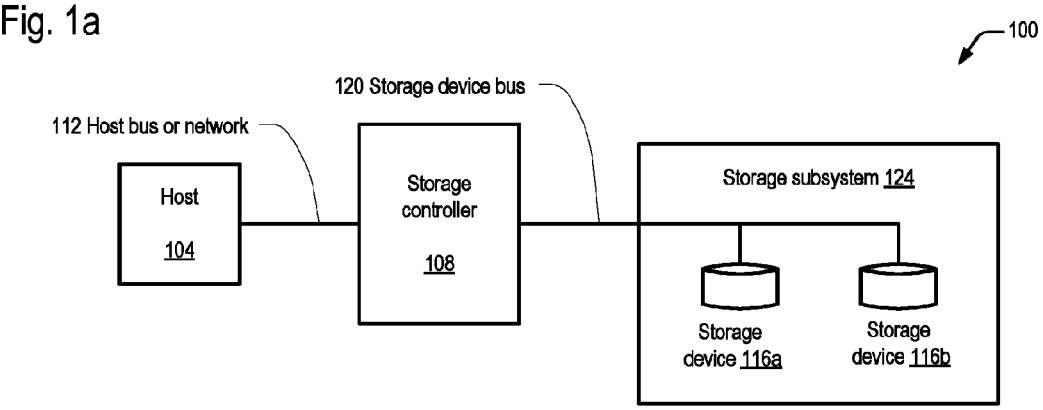
FIG. 1a is a block diagram illustrating components of a first non host-based data storage system in accordance with embodiments of the present invention.

Referring now to FIG. 1a, a block diagram illustrating components of a first non host-based data storage system 100 in accordance with embodiments of the present invention is shown.

The data storage system 100 includes one or more host computers 104. Host computer 104 is generally a server, but could also be a desktop or mobile computer. Host computer 104 executes application programs that generate read and write requests to storage controller 108 over host bus or network 112. Host bus or network 112 in one embodiment is a bus such as SCSI, FC-AL, USB, Firewire, SSA, SAS, SATA, or Infiniband. In another embodiment, host bus or network 112 is a network such as Ethernet, iSCSI, Fiber Channel, SSA, ESCON, ATM, FICON, or Infiniband.

Host computer 104 interfaces with one or more storage controllers 108, although only a single storage controller 108 is illustrated for clarity. In one embodiment, storage controller 108 is a RAID controller. In another embodiment, storage controller 108 is a storage appliance such as a provisioning, virtualization, replication, or backup appliance. Storage controller 108 transfers data to and from storage devices 116a, 116b in storage subsystem 124, over storage device bus 120. Storage device bus 120 is any suitable storage bus or group of buses for transferring data directly between storage controller 108 and storage devices 116, including but not limited to SCSI, Fiber Channel, SAS, SATA, or SSA.

Storage subsystem 124 in one embodiment contains twelve storage devices 116. In other embodiments, storage subsystem 124 may contain fewer or more than twelve storage devices 116. Storage devices 116 include various types of storage devices, including hard disk drives, solid state drives, optical drives, and tape drives. Within a specific storage device type, there may be several sub-categories of storage devices 116, organized according to performance. For example, hard disk drives may be organized according to cache size, drive RPM (5,400, 7,200, 10,000, and 15,000, for example), queue depth, random transfer rate, or sequential transfer rate.

Figure 1B:
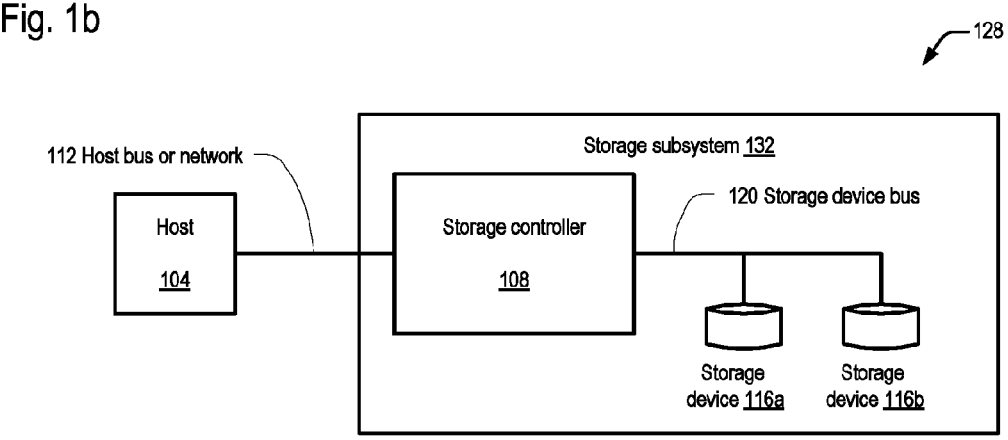
FIG. 1b is a block diagram illustrating components of a second non host-based data storage system in accordance with embodiments of the present invention.

Referring now to FIG. 1b, a block diagram illustrating components of a second non host-based data storage system 128 in accordance with embodiments of the present invention is shown. Non host-based data storage system 128 is similar to non host-based data storage system 100, with the exception being storage controller 108 is within storage subsystem 132, along with storage devices 116. In the embodiment illustrated in FIG. 1b, storage controller 108 is a single RAID controller 108. However, in other embodiments, storage controller 108 represents multiple RAID controllers 108.

Figure 1C:
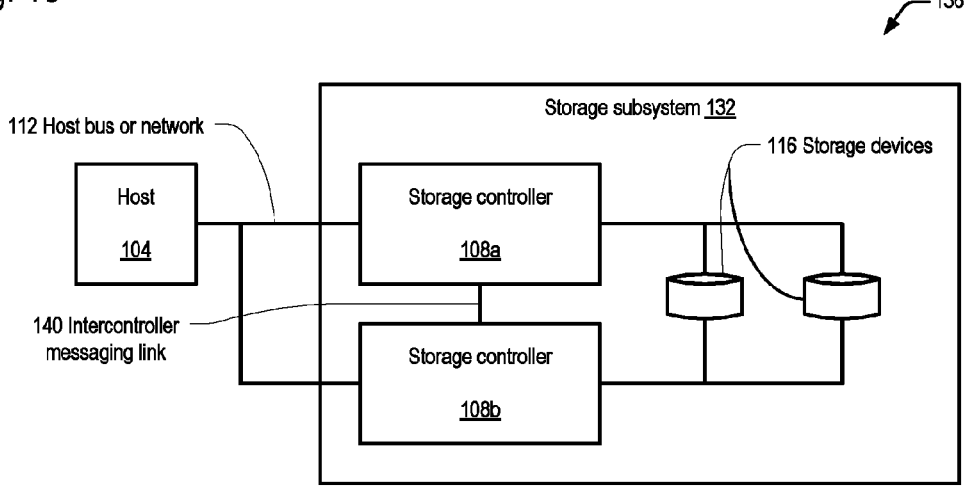
FIG. 1c is a block diagram illustrating components of a third non host-based data storage system in accordance with embodiments of the present invention.

Referring now to FIG. 1c, a block diagram illustrating components of a third host-based data storage system 136 in accordance with embodiments of the present invention is shown. Data storage system 136 is similar to data storage systems 100 and 128, except storage controller 108 represents two redundant storage controllers 108a, 108b. In one embodiment, storage controllers 108a, 108b utilize active-active failover in order to have continued availability to storage devices 116 by host 104 in the event of a failure of one of storage controllers 108a, 108b. Inter-controller messaging link 140 provides a communication and data path between storage controllers 108a, 108b in order to mirror write data and synchronize failover and failback operations.

Figure 2A:
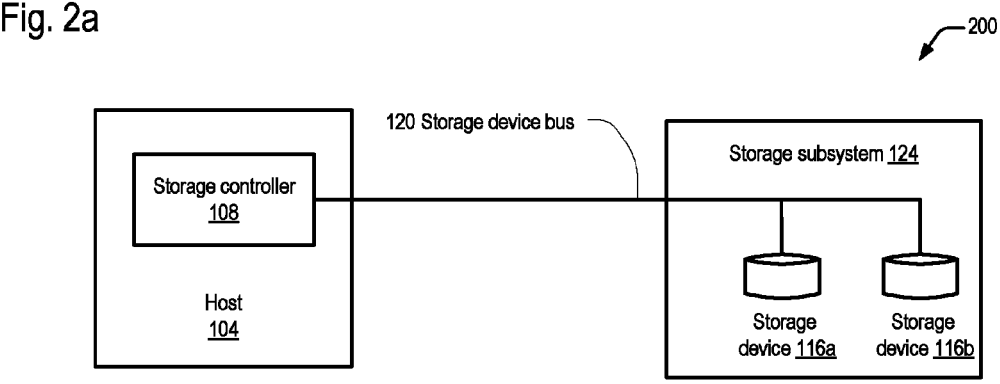
FIG. 2a is a block diagram illustrating components of a first host-based data storage system in accordance with embodiments of the present invention.

Referring now to FIG. 2a, a block diagram illustrating components of a first host-based data storage system 200 in accordance with embodiments of the present invention is shown. First host-based data storage system 200 is similar to first non host-based storage system 100 of FIG. 1a, except storage controller 108 is within host computer 104. Storage controller 108 interfaces through a local bus of host computer 104, where the local bus may be any suitable bus for high speed transfers between the CPU of host computer 104 and storage controller 108, including Rapid IO, PCI, PCI-X, or PCI Express. Storage controller 108 may either be integrated on the motherboard of host computer 104, or may be an add-in board or other form of assembly in host computer 104.

Figure 2B:
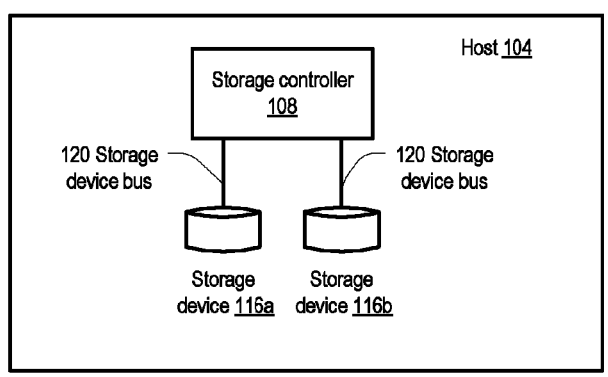
FIG. 2b is a block diagram illustrating components of a second host-based data storage system in accordance with embodiments of the present invention.

Referring now to FIG. 2b, a block diagram illustrating components of a second host-based data storage system 204 in accordance with embodiments of the present invention is shown. Second host-based data storage system 204 integrates the functions of storage subsystem 124 into host computer 104. Data storage system 204 represents a self-contained highly integrated data storage system.

Figure 2C:
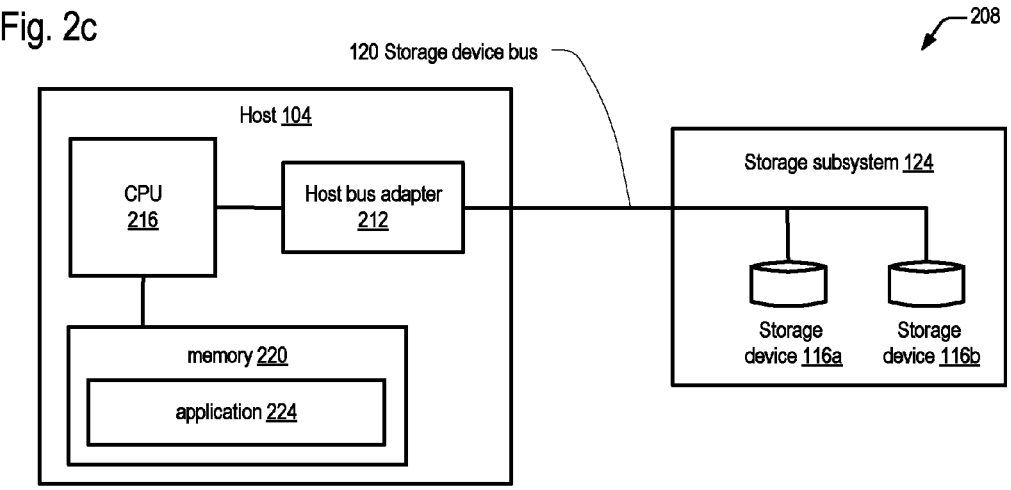
FIG. 2c is a block diagram illustrating components of a third host-based data storage system in accordance with embodiments of the present invention.

Referring now to FIG. 2c, a block diagram illustrating components of a third host-based data storage system 208 in accordance with embodiments of the present invention is shown. Third host-based data storage system 208 is similar to first host-based data storage system 200, but instead of an integrated storage controller 108, a software-based approach is used. Interface between host computer 104 and storage device bus 120 is provided by host bus adapter 212, which provides appropriate data and command buffering functions as well as protocol control and low-level error handling. CPU 216 executes applications 224 in memory 220 to control data flow between memory 220 and storage devices 116a, 116b in storage subsystem 124.

Referring now to FIG. 3, a block diagram illustrating a data storage system 300 in accordance with embodiments of the present invention is shown. Data storage system 300 includes one or more host computers 304, identified as host computers 304a, 304b, 304c, and 304d, interconnected to redundant storage controllers 108a and 108b through bus or network 308. Storage controller 108a receives host read and write requests 332 over controller A host I/O path 340a, and storage controller 108b receives host read and write requests 332 over controller B host I/O path 340b. It should be noted that each of controller A host I/O path 340a and controller B host I/O path 340b is one or more individual data paths, and is shown as a single connection to network 308 for simplicity.

Storage controllers 108a, 108b each include a CPU or processor 312a, 312b, respectively, which executes program instructions stored in a memory 316a, 316b, respectively, coupled to the CPU 312a, 312b. CPU 312a, 312b includes any processing device suitable for executing storage controller 108a, 108b programs, such as Intel x86-compatible processors, embedded processors, mobile processors, and/or RISC processors. CPU 312a, 312b may include several devices including field-programmable gate arrays (FPGAs), memory controllers, North Bridge devices, and/or South Bridge devices.

Memory 316a, 316b may be one or more forms of volatile memory 316, non-volatile memory 316, or a combination of both volatile and non-volatile memories 316. The memory 316a, 316b includes firmware which includes program instructions that CPU 312a, 312b, respectively, fetches and executes, including program instructions for the processes of the present invention. Examples of non-volatile memory 316 include, but are not limited to, flash memory, SD, EPROM, EEPROM, hard disks, and NOVRAM. Volatile memory 316 stores various data structures and user data. Examples of volatile memory 316 include, but are not limited to, SRAM, DDR RAM, DDR2 RAM, DDR3 RAM, Z-RAM, TTRAM, A-RAM, ETA RAM, and other forms of temporary memory.

Each memory 316a, 316b includes a cache memory 320a, 320b, respectively, which provides improved read and write performance to the host computers 304. Host write request data 332 is initially stored in the cache 320 of the storage controller 108 the write is directed to. Memory 316a, 316b also includes LUN metadata 324a, 324b, respectively, and controller metadata 344a, 344b, respectively. LUN metadata 324a, 324b stores parameters related volume or LUN ownership and status, and is described in more detail with respect to FIG. 4a. Controller metadata 344a, 344b stores metadata related to controller status and is described in more detail with respect to FIG. 4b.

Storage controllers 108a, 108b are coupled to one or more storage devices 116 in one or more storage subsystems 124, 132. Storage devices 116 include LUNs 328, identified as LUN 0 328a through LUN 19 328u. Each LUN 328 may be individually addressed by storage controllers 108a, 108b. Write data stored in cache 320a, 320b is written by storage controller 108a, 108b, respectively, to one or more LUNs 328 of storage devices 116.

Data storage system 300 is a redundant data storage system, with redundant storage controllers 108a, 108b providing continuous read and write access between LUNs 328 and storage controllers 108a, 108b. Each storage controller 108 supports independent failover and failback, which are described in more detail with respect to FIGS. 5a-5d. In order to support failover and failback, storage controllers 108a, 108b provide inter-controller communications to understand the health of the other controller and transfer status and data between the storage controllers 108a, 108b.

Storage controller 108a provides a heartbeat and reset communication path 336a to storage controller 108b, and storage controller 108b provides a heartbeat and reset communication path 336b to storage controller 108a. Heartbeat and reset communication paths 336a, 336b provide a periodic signal to the other controller 108 that identifies the sending controller 108 as being at least partially functional. Heartbeat and reset communication paths 336a, 336b also provide a reset request to the other controller 108 to take itself offline while the reset request 336 is asserted.

Storage controllers 108a, 108b share an inter-controller messaging link 140. The inter-controller messaging link 140 allows the storage controllers 108 to provide and respond to various commands and status requests, and transfer cache 320 data to the cache memory 320 of the other controller 108 under circumstances that will be explained herein.

It should be understood that storage controllers 108a, 108b may be functionally organized in countless different functional organizations and architectures without diverting from the scope or operation of the present invention.

Referring now to FIG. 4a, a diagram illustrating LUN metadata 324 in accordance with embodiments of the present invention is shown. LUN metadata 324 includes various parameters required for storage controllers 108 to manage LUNs 328 and data in the cache 320. LUN metadata 324 is stored on storage devices 116, and is read into storage controller memory 316 under certain conditions that will be described later. However, LUN metadata 324 is written back to storage devices 116 any time a storage controller 108 makes changes to the LUN metadata 324. For each LUN 328, LUN metadata 324 includes identification of the current owner 408, preferred owner 412, previous owner 416, whether the LUN 328 is write protected 420, and in some embodiments, if the LUN 328 has had a clean shutdown 424.

The current owner 408 identifies the storage controller 108 that currently has ownership of the LUN 328. At all times, every LUN 328 has a current owner 408. In the preferred embodiment, the current owner 408 is identified by a serial number of the storage controller 108 that owns the LUN 328, where each storage controller 108 is factory programmed with a unique serial number. In other embodiments, a storage controller ID or slot ID is used to identify the storage controller 108 that is the current owner 408. In yet other embodiments, a different storage controller 108 identification scheme is used.

The preferred owner 412 identifies the storage controller 108 that the user or system administrator wishes to own the LUN 328 under normal operating conditions. The preferred owner 412 is generally established during initial system configuration, and can be changed by a user or system administrator using a configuration utility, GUI, or some other method. In the preferred embodiment, the preferred owner 412 is identified with a slot ID, which is a system-level ID identifying a physical location the storage controller 108 is installed in a storage subsystem 132. In other embodiments, the preferred owner 412 may be identified by a storage controller 108 serial number or other means of identification.

The previous owner 416 identifies the storage controller 108 that owned the corresponding LUN 328 before the current owner 408. The previous owner 416 is maintained in the LUN metadata 324 in order to know if good data is available in all cases. This is explained in further detail with respect to FIG. 8. For example, FIG. 4a illustrates an example where the current storage controllers 108 in a system 300 are "controller A" and "controller B". Controller A is the previous owner 416 for LUNs 0, x, and z. Controller B is the previous owner 416 for LUNs 2 and y. Controller C, which has been removed from the system 300 due to a previous storage controller 108 replacement or upgrade operation, is the previous owner 416 of LUN 1. In the preferred embodiment, the previous owner 416 is identified by a serial number of the storage controller 108 that was the previous owner 416 of the LUN 328, where each storage controller 108 is factory programmed with a unique serial number. In other embodiments, a storage controller ID or slot ID is used to identify the storage controller 108 that is the previous owner 416. In yet other embodiments, a different storage controller 108 identification scheme is used.

The write protected flag 420 identifies if a LUN 328 must be write protected in order to prevent data from being overwritten.

The clean shutdown flag 424 identifies if a LUN 328 was shutdown cleanly, previously. A clean shutdown 424 guarantees that all of the cache 320 data corresponding to a LUN 328 has been successfully written out to storage devices 116.

Referring now to FIG. 4b, a diagram illustrating controller metadata 344 in accordance with embodiments of the present invention is shown. Controller metadata 344 are parameters maintained in storage controller memory 316 of each storage controller 108.

Controller metadata 344 includes controller status 428 for each storage controller 108. Controller status 428 includes an indication of whether the corresponding storage controller 108 is either in normal operation, failed, or booting. Controller status 428a applies to controller A, and controller status 428b applies to controller B. In the preferred embodiment, the designation of "controller A" or "controller B" depends on the physical location the storage controller 108 is installed in a storage subsystem 132.

Controller metadata 344 also includes controller serial numbers 432 for each storage controller 108. Controller serial number 432a is the serial number for storage controller A, and controller serial number 432b is the serial number for storage controller B. In the preferred embodiment, the designation of "controller A" or "controller B" depends on the physical location the storage controller 108 is installed in a storage subsystem 132. If a storage controller 108 is "controller A", it will always store its' own serial number 432, and will obtain the serial number 432 of the other storage controller 108 through the inter-controller link 140.

Controller metadata 344 also includes controller failover/failback scheduling flags 436. A given storage controller 108 only maintains controller failback/failover scheduling flags 436 for itself, and not for other storage controllers 108. Controller failover/failback scheduling flags 436 include controller failover on boot scheduled 436a, controller regular failover scheduled 436b, and controller failback scheduled 436c. Controller failover/failback scheduling flags 436 are central to the present invention, and the operation of the flags 436 is described in more detail with respect to FIGS. 6-13.

Referring now to FIG. 5a, a block diagram illustrating normal storage controller 108 operation in accordance with embodiments of the present invention is shown. The storage controller 108 system illustrated in FIGS. 5a-5d is a redundant system including two identical storage controllers 108, identified as storage controller A 108a and storage controller B 108b. Both storage controllers 108a, 108b are interconnected to each other through inter-controller link 140 and a pair of heartbeat/reset links 336a, 336b. Both storage controllers 108a, 108b are also interconnected to one or more storage devices 116, which includes four LUNs 328 identified as LUN 0 328a, LUN 1 328b, LUN 2 328c, and LUN 3 328d.

It is assumed that in normal operation, storage controller A 108a is the current owner 408 for LUNs 0 328a and 3 328d, and storage controller B 108b is the current owner 408 for LUNs 1 328b and 2 328c. The current owner 408 status is identified in LUN metadata 324a, 324b, which is read from storage devices 116 and stored in the memory 316 of each storage controller 108a, 108b.

Referring now to FIG. 5b, a block diagram illustrating storage controller B 108b failure in accordance with embodiments of the present invention is shown. Storage controller B 108b has experienced an internal malfunction, resulting in loss of heartbeat 336b to storage controller A 108a.

Referring now to FIG. 5c, a block diagram illustrating storage controller B 108b failover in accordance with embodiments of the present invention is shown. Storage controller A 108a, observing the loss of heartbeat 336b, takes over the LUNs 328 where storage controller B 108b was the current owner 408, thereby resulting in storage controller A 108a now being the current owner 408 of all four LUNs 328a, 328b, 328c, and 328d.

Referring now to FIG. 5d, a block diagram illustrating storage controller B 108b failback in accordance with embodiments of the present invention is shown. Failback follows either repair or replacement of storage controller B 108b, and a successful reboot by storage controller B 108b. In a failback operation, storage controller A 108a restores to storage controller B 108b the LUNs 328 where storage controller B 108b is the preferred 412, but not the current 408, owner. Therefore, LUNs 1 328b and 2 328c are restored to storage controller B 108b. LUN metadata 324a and 324b reflect the current owner 408 assignments after the failback operation. Additionally, as part of the failback operation, storage controller A 108a copies the contents of its cache 320a to the storage controller B 108b cache 320b. This ensures that all of the write data has been restored and both storage controller A 108a and storage controller B 108b will be assured of writing back good data to the storage devices 116.

Referring now to FIG. 6a, a flowchart illustrating a first portion of a single controller 108 boot process in accordance with embodiments of the present invention is shown. FIGS. 6a-6c identifies the execution steps occurring within any single storage controller 108. Therefore, it should be understood that each storage controller 108a, 108b independently executes the processes of FIGS. 6-13, and at any given time each storage controller 108 may be executing different process steps than the other storage controller 108 of the same redundant pair 108a, 108b. When the second storage controller 108b is executing the process steps of FIGS. 6-13, it behaves as the "first storage controller" described in the figures, and treats the first storage controller 108a as the "second storage controller" described in the figures. Alternatively, if the language of "first storage controller" and "second storage controller" of FIGS. 6-13 is swapped, the steps will reflect the actions taken by the second storage controller 108b. Flow begins at block 604.

At block 604, after the storage controller 108 powers up, the first storage controller 108a sets failover on boot scheduled 436a, regular failover scheduled 436b, and failback scheduled 436c to False. This initializes the failover/failback flags 436 to an inactive state, and requires various events described with respect to FIGS. 6-13 to set the flags. Flow proceeds to block 608.

At block 608, the first storage controller 108a initializes internal hardware. This configures the storage controller 108 to the proper state to run as designed. Flow proceeds to block 612.

At block 612, the first storage controller 108a runs diagnostics. Flow proceeds to decision block 616.

At decision block 616, the first storage controller 108a determines if the diagnostics pass. If the diagnostics do not pass, then there is a failure in the first storage controller 108a, and flow proceeds to block 620. If the diagnostics do pass, then the first storage controller 108a has been established to be operational, and flow proceeds to block 624.

At block 620, the first storage controller 108a boot fails, and the first storage controller 108a does not transmit a heartbeat 336a to the second storage controller 108b. The second storage controller 108b notes that a heartbeat 336a is not received from the first storage controller 108a, and internally follows the path identified by decision block 636 and block 652. Flow ends at block 620.

At block 624, the first storage controller 108a boots its' own operating system and initializes internal processes. Flow proceeds to block 628.

At block 628, the first storage controller 108a starts sending a heartbeat signal 336a to the second storage controller 108b. Flow proceeds to block 632.

At block 632, the first storage controller 108a enables receiving the heartbeat 336b from the second storage controller 108b. Flow proceeds to decision block 636.

At decision block 636, the first storage controller 108a attempts to detect a heartbeat 336b from the second storage controller 108b. If the first storage controller 108a receives a heartbeat 336b from the second storage controller 108b, then the second storage controller 108b is at least partially functional and flow proceeds to block 640. If the first storage controller 108a does not receive a heartbeat 336b from the second storage controller 108b, then the second storage controller 108b is not at least partially functional and flow instead proceeds to block 652.

At block 640, the first storage controller 108a initializes the inter-controller link 140 between the first storage controller 108a and the second storage controller 108b. Flow proceeds to block 644.

At block 644, the first storage controller 108a exchanges a boot handshake message with the second storage controller 108b across the inter-controller link 140. Flow proceeds to decision block 648.

At decision block 648, the first storage controller 108a determines if the boot handshake is successful. If the boot handshake is not successful, then either the inter-controller link 140 has a fault, or else the second storage controller 108b has a fault, and flow proceeds to block 652. If the boot handshake is successful, then the first storage controller 108a is able to fully communicate with the second storage controller 108b, and flow proceeds to block 656 of FIG. 6b.

At block 652, the heartbeat 336*b* has not been received from the second storage controller 108*b*, or the boot handshake message across the inter-controller link 140 has failed, or a reset request has been received from the second storage controller 108*b*. In either case, the first storage controller 108*a* schedules a failover on boot process. Block 652 is represented in more detail in FIG. 7. Flow proceeds to block 656 of FIG. 6*b*.

Referring now to FIG. 6*b*, a flowchart illustrating a second portion of a single controller 108 boot process in accordance with embodiments of the present invention is shown. Flow begins at block 656, continuing from blocks 648 and 652 of FIG. 6*a*.

At block 656, the first storage controller 108*a* reads LUN metadata 324 from storage devices 116 to determine current 408, preferred 412, and previous 416 owners of all LUNs 328, write protection status 420, and clean shutdown status 424. LUN metadata 324 is stored in predetermined areas of storage devices 116. In one embodiment, each LUN 328 has associated LUN metadata 324 stored with the LUN 328. In another embodiment, the LUN metadata 324 for all LUNs 328 is stored in a common area of storage devices 116. Flow proceeds to block 660.

At block 660, the first storage controller 108*a* takes ownership of all LUNs 328 where the first storage controller 108*a* is both the current 408 and the preferred 412 owner. In the example illustrated in FIG. 4*a*, the first storage controller 108*a* ("controller A") therefore takes ownership of LUNs 0, 1, x, and z. Flow proceeds to block 664.

At block 664, the first storage controller 108*a* checks the previous owner 416, and takes appropriate action for all LUNs 328 currently owned by the first storage controller 108*a*. Therefore, the action taken would be for LUNs 0, 1, x, and z. Block 664 is represented in more detail in FIG. 8. Flow proceeds to decision block 668.

At decision block 668, the first storage controller 108*a* determines if the inter-controller link 140 is down or inoperative, or if there is a reset request or no heartbeat 336*b* from the second storage controller 108*b*. Each of these represents a problem with the second storage controller 108*b*. Each storage controller 108 monitors for internal failure conditions which a reset from the other storage controller 108 can either repair or else prevent data corruption. If such internal failure conditions are detected, a storage controller 108 will assert a reset request across the inter-controller link 140 to the other storage controller 108, and the other storage controller 108 will responsively reset the storage controller 108. If the first storage controller 108*a* determines that the inter-controller link 140 is operative, there is a not a reset request, and there is a heartbeat 336*b* from the second storage controller 108*b*, then flow proceeds to decision block 672. If the first storage controller 108*a* does determine that the inter-controller link 140 is down or inoperative, or if there is a reset request or no heartbeat 336*b* from the second storage controller 108*b*, then flow proceeds to block 682.

At decision block 672, the first storage controller 108*a* determines if there are any LUNs 328 where the first storage controller 108*a* is the preferred 412 but not the current 408 owner. In the example of FIG. 4*a*, the first storage controller 108*a* is the preferred 412 but not the current 408 owner for none of the LUNs 328. If there are any LUNs 328 where the first storage controller 108*a* is the preferred 412 but not the current 408 owner, then flow proceeds to decision block 676. If there are not any LUNs 328 where the first storage controller 108*a* is the preferred 412 but not the current 408 owner, then flow proceeds to decision block 686 of FIG. 6*c*.

At decision block 676, the first storage controller 108*a* determines if a failback complete message has been received from the second storage controller 108*b* over the inter-controller link 140. If a failback complete message has not been received from the second storage controller 108*b* over the inter-controller link 140, the flow proceeds to decision block 680. If a failback complete message has been received from the second storage controller 108*b* over the inter-controller link 140, then flow proceeds to block 684.

At decision block 680, the first storage controller 108*a* determines if the inter-controller link 140 is down or inoperative, or if there is a reset request or no heartbeat 336*b* from the second storage controller 108*b*. Each of these represents a problem with the second storage controller 108*b*. Each storage controller 108 monitors for internal failure conditions which a reset from the other storage controller 108 can either repair or else prevent data corruption. If such internal failure conditions are detected, a storage controller 108 will assert a reset request across the inter-controller link 140 to the other storage controller 108, and the other storage controller 108 will responsively reset the storage controller 108. If the first storage controller 108*a* determines that the inter-controller link 140 is operative, there is not a reset request, and there is a heartbeat 336*b* from the second storage controller 108*b*, then flow proceeds to decision block 676. If the first storage controller 108*a* does determine that the inter-controller link 140 is down or inoperative, or if there is a reset request or no heartbeat 336*b* from the second storage controller 108*b*, then flow proceeds to block 682.

At block 682, the heartbeat 336*b* has not been received from the second storage controller 108*b*, or the inter-controller link 140 is inoperative, or a reset request has been received from the second storage controller 108*b*. In either case, the first storage controller 108*a* schedules a failover on boot process. Block 682 is represented in more detail in FIG. 7. Flow proceeds to block 690 of FIG. 6*c*.

At block 684, the first storage controller 108*a* schedules a regular failover process. Block 684 is represented in more detail in FIG. 9. Flow proceeds to block 690 of FIG. 6*c*.

Referring now to FIG. 6*c*, a flowchart illustrating a third portion of a single controller 108 boot process in accordance with embodiments of the present invention is shown. Flow begins at decision block 686, continuing from decision block 672 of FIG. 6*b*.

At decision block 686, the first storage controller 108*a* determines if there are any LUNs 328 where the first storage controller 108*a* is the current 408 but not the preferred 412 owner. If there are any LUNs 328 where the first storage controller 108*a* is the current 408 but not the preferred 412 owner, then flow proceeds to block 688. If there are not any LUNs 328 where the first storage controller 108*a* is the current 408 but not the preferred 412 owner, then flow proceeds to block 690.

At block 688, if not previously scheduled, the first storage controller 108*a* sets failback scheduled 436*c* to True. This has the effect of making sure a failback operation is scheduled. Flow proceeds to block 690.

At block 690, the first storage controller 108*a* runs scheduled regular failover, failover on boot, or failback processes. Block 690 is represented in more detail in FIG. 10 for a regular failover process, FIGS. 11*a* and 11*b* for a failover on boot process, and FIG. 12 for a failback process. Flow proceeds to block 692.

At block 692, the first storage controller 108*a* ends the boot process. This means the first storage controller 108*a* has resolved all pending failover or failback situations, and is able to operate conventionally in a redundant controller system. Flow proceeds to block 694.

At block 694, the first storage controller 108a waits for a new failover or failback request. A new failover request may come from three sources: 1) The first storage controller 108a observes the second storage controller 108b fails if the heartbeat 336b from the second storage controller 108b is no longer received or if the inter-controller link 140 is down, 2) if the second storage controller 108b detects an error condition that prevents the second storage controller 108b from operating properly and requests a regular failover from the first storage controller 108a, or 3) The second storage controller 108b is shutting down.

When shutting down, the second storage controller 108b informs the first storage controller 108a it is shutting down, and performs a failback operation for the LUNs 328 for which the second storage controller is both the current 408 and the preferred 412 owner. Once the failback operation is complete, the second storage controller 108b sends a failback complete message to the first storage controller 108a over the inter-controller link 140. After receiving the failback complete message from the second storage controller 108b, the first storage controller 108a schedules a regular failover. Flow ends at block 694.

Referring now to FIG. 7, a flowchart illustrating a schedule failover on boot 652, 682 process in accordance with embodiments of the present invention is shown. Flow begins at block 704.

At block 704, the first storage controller 108a determines if a failover on boot is already scheduled, by reviewing the failover on boot scheduled flag 436a. Flow proceeds to decision block 708.

At decision block 708, the first storage controller 108a determines if the failover on boot flag 436a is set to True. If the failover on boot flag 436a is not set to True, then flow proceeds to block 712. If the failover on boot flag 436a is set to True, then flow ends.

At block 712, the first storage controller 108a asserts a reset 336a to the second storage controller 108b. This causes the second storage controller 108b to shut down, until such time as the first storage controller 108a de-asserts the reset (block 1304 of FIG. 13). Flow proceeds to block 716.

At block 716, the first storage controller 108a sets the failover on boot scheduled flag 436a to True. Flow ends at block 716.

Referring now to FIG. 8, a flowchart illustrating a storage controller action process based on checking a previous owner 664 in accordance with embodiments of the present invention is shown. Flow begins at block 804.

At block 804, the first storage controller 108a reads the LUN metadata 324 from the storage devices 116 into the memory 316a. Flow proceeds to block 808.

At block 808, the first storage controller 108a identifies a first LUN 328 currently owned by the first storage controller 108a. In the example of FIG. 4a, the first LUN 328 currently owned by the first storage controller 108a could be LUN 0 328a, LUN 1 328b, LUN x 328x, or LUN z 328z. Flow proceeds to decision block 812.

At decision block 812, the first storage controller 108a determines if the previous owner 416 serial number is the same as the current owner 408 serial number for the selected LUN 328. For LUN 0 328a, LUN x 328x, and LUN z 328z, decision block 812 would resolve to True, since controller A is both the current 408 and previous 416 owner. However, LUN 1 328b would resolve to False since the current owner 408 is controller A and the previous owner 416 is controller C. If the previous owner 416 serial number is not the same as the current owner 408 serial number for the selected LUN 328, then flow proceeds to block 816. If the previous owner 416 serial number is the same as the current owner 408 serial number for the selected LUN 328, then flow proceeds to block 820.

At block 816, the first storage controller 108a puts the selected LUN 328 into write protected mode. This means the first storage controller 108a sets the write protected flag 420 for the selected LUN 328 to True. The good cache data is in the cache 320 of the previous controller 108, instead of the cache 320a of the first storage controller 108a. Flow proceeds to decision block 824.

At block 820, the first storage controller 108a puts the selected LUN 328 online. The cache 320a of the first storage controller 108a contains good data and therefore it is safe to put the selected LUN 328 online without the write protection flag 420 enabled for the selected LUN 328. Flow proceeds to decision block 824.

At decision block 824, the first storage controller 108a determines if all of the LUNs 328 currently owned 408 by the first storage controller 108a have been processed. If all of the LUNs 328 currently owned 408 by the first storage controller 108a have not been processed, then flow proceeds to block 828. If all of the LUNs 328 currently owned 408 by the first storage controller 108a have been processed, then flow ends at decision block 824.

At block 828, the first storage controller 108a identifies a next LUN 328 currently owned 408 by the first storage controller 108a. The next LUN 328 will be a LUN 328 that has not yet been processed by blocks 808-824 of FIG. 8. Flow proceeds to decision block 812.

Referring now to FIG. 9, a flowchart illustrating a schedule regular failover process 684 in accordance with embodiments of the present invention is shown. Flow begins at block 904.

At block 904, the first storage controller 108a determines if a regular failover has been scheduled. The first storage controller 108a checks the regular failover scheduled flag 436b in the controller metadata 344. Flow proceeds to decision block 908.

At decision block 908, the first storage controller 108a determines if the regular failover scheduled flag 436b is True. If the regular failover scheduled flag 436b is not True, then flow proceeds to decision block 912. If the regular failover scheduled flag 436b is True, then the process ends.

At decision block 912, the first storage controller 108a determines if the inter-controller link 140 is down or inoperative, or if there is a reset request or no heartbeat 336b from the second storage controller 108b. All of these represent a problem with the second storage controller 108b. If the first storage controller 108a determines that the inter-controller link 140 is operative, there is a not a reset request, and there is a heartbeat 336b from the second storage controller 108b, then flow proceeds to decision block 920. If the first storage controller 108a does determine that the inter-controller link 140 is down or inoperative, or if there is a reset request or no heartbeat 336b from the second storage controller 108b, then flow proceeds to block 916.

At block 916, the first storage controller 108a assets a reset 336a to the second storage controller 108b. This causes the second storage controller 108b to shut down, until such time as the first storage controller 108a de-asserts the reset (block 1304 of FIG. 13). Flow proceeds to block 924.

At decision block 920, the first storage controller 108a determines if a failback complete message is received over the inter-controller link 140 from the second storage controller 108b. If a failback complete message is received over the inter-controller link 140 from the second storage controller 108b, then flow proceeds to block 924. If a failback complete message is not received over the inter-controller link 140 from the second storage controller 108b, then flow ends at block 920.

At block 924, the first storage controller 108a sets the regular failover scheduled flag 436b to True. Flow ends at block 924.

Referring now to FIG. 10, a flowchart illustrating a regular failover process 690 in accordance with embodiments of the present invention is shown. Flow begins at block 1004.

At block 1004, the first storage controller 108a determines that the regular failover scheduled flag 436b is True. Flow proceeds to decision block 1008.

At decision block 1008, the first storage controller 108a determines if a failback complete message is received over the inter-controller link 140 from the second storage controller 108b. If a failback complete message is received over the inter-controller link 140 from the second storage controller 108b, then flow proceeds to block 1020. If a failback complete message is not received over the inter-controller link 140 from the second storage controller 108b, then flow proceeds to block 1012.

At block 1012, the second storage controller 108b has failed. Either the heartbeat 336b has been lost, the inter-controller link 140 is down, or else a reset request has been issued by the second storage controller 108b. Flow proceeds to block 1016.

At block 1016, the first storage controller 108a becomes the current owner 408 of all LUNs 328 that the second storage controller 108b was both the current owner 408 and the preferred owner 412 of. Flow proceeds to block 1024.

At block 1020, the first storage controller 108a becomes the current owner 408 and the preferred owner 412 of all LUNs 328 that the second storage controller 108b was the current owner 408, but not the preferred owner 412 for. Flow proceeds to block 1024.

At block 1024, the first storage controller 108a updates LUN metadata 314 with the first storage controller 108a serial number for all LUNs 328 that the first storage controller 108a is the current owner 408. Flow proceeds to block 1028.

At block 1028, the first storage controller 108a updates the previous owner 416 in LUN metadata 324 with the first storage controller 108a serial number for all LUNs 328 that the first storage controller 108a is the current owner 408. Flow proceeds to block 1032.

At block 1032, the first storage controller 108a updates memory 316 data structures to handle cache 320 data for newly owned LUNs 328. These memory 316 data structures are separate from metadata 324, 344. Flow proceeds to block 1036.

At block 1036, the first storage controller 108a sets the regular failover scheduled flag 436b to False and places all LUNs 328 online. This resets the regular failover scheduled flag 436b in order to await a new scheduling for a regular failover action. Flow ends at block 1036.

Referring now to FIG. 11a, a flowchart illustrating a first portion of a failover on boot process 690 in accordance with embodiments of the present invention is shown. Flow begins at block 1104.

At block 1104, the first storage controller 108a determined that the failover on boot flag 436a is set to True. Flow proceeds to block 1108.

At block 1108, the first storage controller 108a becomes the current owner 408 of all LUNs 328 that the first storage control 108a is not the current owner 408. In the example of FIG. 4a, this means the first storage controller 108a becomes the current owner 408 for LUN 2 328c and LUN y 328y. Flow proceeds to block 1112.

At block 1112, the first storage controller 108a updates LUN metadata 324 with the first storage controller 108a serial number for all LUNs 328 that the first storage controller 108a is the current owner 408. Any time LUN metadata 324 is updated, the storage controller 108 writes the LUN metadata 324 out to storage devices 116. Flow proceeds to block 1116.

At block 1116, the first storage controller 108a identifies a first LUN 328 currently owned 408 by the first storage controller 108a. In the example of FIG. 4a, this would be either LUN 0 328a, LUN 1 328b, LUN x 328x, or LUN z 328z. Flow proceeds to decision block 1120.

At decision block 1120, the first storage controller 108a determines if the previous owner 416 serial number is the same as the current owner 408 serial number for the selected LUN 328. For LUN 0 328a, LUN x 328x, and LUN z 328z, decision block 1120 would resolve to True, since controller A is both the current 408 and previous 416 owner. However, LUN 1 328b would resolve to False since the current owner 408 is controller A and the previous owner 416 is controller C. If the previous owner 416 serial number is not the same as the current owner 408 serial number for the selected LUN 328, then flow proceeds to block 1124. If the previous owner 416 serial number is the same as the current owner 408 serial number for the selected LUN 328, then flow proceeds to block 1128.

At block 1124, the first storage controller 108a puts the selected LUN 328 into write protected mode. This means the first storage controller 108a sets the write protected flag 420 for the selected LUN 328 to True. The good cache data is in the cache 320 of the previous controller 108, instead of the cache 320a of the first storage controller 108a. Flow proceeds to decision block 1132.

At block 1128, the first storage controller 108a puts the selected LUN 328 online. The cache 320a of the first storage controller 108a contains good data and therefore it is safe to put the selected LUN 328 online without the write protection flag 420 enabled for the selected LUN 328. Flow proceeds to decision block 1132.

At decision block 1132, the first storage controller 108a determines if all of the LUNs 328 currently owned 408 by the first storage controller 108a have been processed. If all of the LUNs 328 currently owned 408 by the first storage controller 108a have not been processed, then flow proceeds to block 1136. If all of the LUNs 328 currently owned 408 by the first storage controller 108a have been processed, then proceeds to decision block 1140 of FIG. 11b.

At block 1136, the first storage controller 108a identifies a next LUN 328 currently owned 408 by the first storage controller 108a. The next LUN 328 will be a LUN 328 that has not yet been processed by blocks 1116-1132 of FIG. 11a. Flow proceeds to decision block 1120.

Referring now to FIG. 11b, a flowchart illustrating a second portion of a failover on boot process 690 in accordance with embodiments of the present invention is shown. Flow begins at decision block 1140, continuing from decision block 1132 of FIG. 11a.

At decision block 1140, the first storage controller 108a determines if all the LUNs 328 currently owned 408 by the first storage controller 108a are in write protected mode. The first storage controller 108a reviews the write protected flags 420 for all LUNs 328 currently owned 408 by the first storage controller 108a, which would be LUN 0 328a, LUN 1 328b, LUN x 328x, and LUN z 328z. If all the LUNs 328 currently owned 408 by the first storage controller 108a are in write protected mode, then flow proceeds to block 1144. If all the LUNs 328 currently owned 408 by the first storage controller 108a are not in write protected mode, then flow proceeds to block 1160.

At block 1144, the first storage controller 108a has stale data in the cache memory 320a, and the second storage controller 108b has good data in the cache 320b. Flow proceeds to block 1148.

At block 1148, the first storage controller 108a abandons the failover on boot process and sets the failover on boot scheduled flag 436a to False. Flow proceeds to block 1152.

At block 1152, the first storage controller 108a verifies the second storage controller 108b is working properly. The first storage controller 108a verifies the second storage controller 108b is working properly by confirming that a heartbeat 336b from the second storage controller 108b is present, and the boot handshake message over the inter-controller link 140 is successful. Flow proceeds to block 1156.

At block 1156, the first storage controller 108a transfers write cache data from the second storage controller cache memory 320b to the first storage controller cache memory 320a over the inter-controller link 140. Flow ends at block 1156.

At block 1160, the first storage controller 108a has good data in the cache memory 320a of the first storage controller 108a, and therefore the failover on boot process should continue. Flow proceeds to block 1164.

At block 1164, the first storage controller 108a updates the previous owner 416 in LUN metadata 324 with the first storage controller 108a serial number for all LUNs 328 that the first storage controller 108a is the current owner 408. Flow proceeds to block 1166.

At block 1166, the first storage controller 108a sets the write protected flag 420 to FALSE for LUNs 328 that the first storage controller 108a is the current owner 408 and the LUN is write protected 420. Flow proceeds to block 1168.

At block 1168, the first storage controller 108a updates memory 316 data structures to handle cache data for newly owned LUNs 328. Flow proceeds to block 1172.

At block 1172, the first storage controller 108a places all LUNs 328 online. Flow proceeds to block 1176.

At block 1176, the first storage controller 108a sets the failover on boot scheduled flag 436a to False. Flow ends at block 1176.

Referring now to FIG. 12, a flowchart illustrating a failback process 690 in accordance with embodiments of the present invention is shown. Flow begins at block 1204.

At block 1204, the first storage controller 108a determines that the failback scheduled flag 436c is True. Flow proceeds to block 1208.

At block 1208, the first storage controller 108a makes necessary host interface changes, including notifying host computer(s) 104, 304 of path 340 changes for access to specific LUNs 328. Flow proceeds to block 1212.

At block 1212, the first storage controller 108a transfers all write cache data across inter-controller link 140 to the second storage controller 108b for all LUNs 328. The good cache data is in the first storage controller 108a cache, and therefore the first storage controller 108a transfers the cache data to the second storage controller cache 320b. Flow proceeds to block 1216.

At block 1216, the first storage controller 108a changes the current owner 408 for all LUNs 328 that the first storage controller 108a was the current owner 408, but not the preferred owner 412, to the second storage controller 108b. This updates the LUN metadata 324 to reflect the second storage controller 108b as the current 408 and preferred 412 owner for the same LUNs 328. Flow proceeds to block 1220.

At block 1220, the first storage controller 108a sends a failback complete message across the inter-controller link 140 to the second storage controller 108b. This lets the second storage controller 108b know that the first storage controller 108a has completed all failback actions and has updated LUN metadata 324 accordingly. Flow proceeds to block 1224.

At block 1224, the first storage controller 108a sets the failback scheduled flag 436c to False. This resets the failback scheduled flag 436c in order to await a new scheduling for a failback action. Flow ends at block 1224.

Referring now to FIG. 13, a flowchart illustrating a data recovery process 1156 to obtain good data from a second storage controller 108b in accordance with embodiments of the present invention is shown. FIG. 13 illustrates a data recovery process when the first storage controller 108a is in a failover on boot situation, where the first storage controller cache 320a contains stale data. FIG. 13 does not apply to a failback situation similar to block 1212, since the direction of cache data transfer across the inter-controller link 140 is in the opposite direction from the first storage controller 108a to the second storage controller 108b.

At the start of the process of FIG. 13, the second storage controller 108b is not operational, the inter-controller link 140 is down since first storage controller 108a has previously asserted the reset signal 336a to the second storage controller 108b, and the first storage controller cache 320a contains stale data. Based on the current 408 and previous 416 ownership data in the LUN metadata 324, the first storage controller 108a has determined that the first storage controller cache 320a contains stale data that it should not write out to storage devices 116. Flow begins at block 1304.

At block 1304, the first storage controller 108a de-asserts the reset 336a to the second storage controller 108b, allowing the second storage controller 108b to boot. The reset 336a was previously asserted in block 712 of FIG. 7 corresponding to the schedule failover on boot process. Flow proceeds to decision block 1308.

At decision block 1308, the first storage controller 108a determines if the boot handshake message exchanged across the inter-controller link 140 is successful. If the boot handshake message exchanged across the inter-controller link 140 is successful, then flow proceeds to block 1316. If the boot handshake message exchanged across the inter-controller link 140 is not successful, then flow proceeds to block 1312.

At block 1312, the first storage controller 108a asserts reset 336a to the second storage controller 108b. This keeps the second storage controller 108b from booting. The first storage controller 108a abandons the automatic recovery process, and instead waits for manual recovery. The first storage controller 108a is already the current owner 408 for all LUNs 328 in the storage system; therefore there is not a need to initiate a regular failover or failover on boot process. Flow ends at block 1312.

At block 1316, the first storage controller 108a requests the second storage controller 108b to transfer write cache data for all LUNs 328 from the second storage controller cache memory 320b to the first storage controller cache memory 320a. The request is transferred over the inter-controller link 140 between the first storage controller 108a and the second storage controller 108b. Flow proceeds to decision block 1320.

At decision block 1320, the first storage controller 108a determines if the write cache 320 data transfer of Block 1316 is complete. If the write cache 320 data transfer is complete, then flow proceeds to block 1324. If the write cache 320 data transfer is not complete, then flow proceeds to decision block 1336.

At block 1324, the first storage controller 108a establishes that the first storage controller write cache 320a contains the latest data. This means the first storage controller write cache 320a does not contain stale data. Flow proceeds to block 1326.

At block 1326, the first storage controller 108a updates the previous owner 416 in LUN metadata 324 with the first storage controller 108a serial number for LUNs 328 that the first storage controller 108a is the current owner 408. Flow proceeds to block 1328.

At block 1328, the first storage controller 108a sets the write protected flag 420 to False for all LUNs 328 that the first storage controller 108a is the current owner 408 for. Additionally, the first storage controller 108a places all LUNs 328 online, and available for host computers 104, 304 to access. Flow proceeds to block 1332.

At block 1332, the first storage controller 108a sets the failback scheduled flag 436c to True in order to make the second storage controller 108b the current owner 408 of the LUNs 328 for which the first storage controller 108a is the current owner 408, but not the preferred owner 412. Flow ends at block 1332.

At decision block 1336, the first storage controller 108a determines if the second storage controller 108b has failed. The first storage controller 108a determines the second storage controller 108b has failed if either there is no heartbeat 336b from the second storage controller 108b, or the inter-controller link 140 is inoperative. If the second storage controller 108b has not failed, then flow proceeds to block 1320 to check if the write cache data transfer is complete. If the second storage controller 108b has failed, then flow proceeds to block 1340.

At block 1340, the first storage controller 108a abandons the automatic recovery process, and waits for manual recovery. The first storage controller 108a notifies a user or system administrator that manual recovery is required since automatic recovery requires the second storage controller 108b to be fully operational, and something is preventing the second storage controller 108b from achieving a fully operational status. The first storage controller 108a does not have good data in its cache 320a, and all the LUNs 328 are write protected 420. Flow ends at block 1340.

Although FIG. 13 illustrates a preferred embodiment data recovery process, it should be noted that countless such processes are encompassed by the present invention. Data recovery processes require getting the second storage controller 108b to boot up again, obtaining good cache data from the second storage controller cache 320b, and making each storage controller 108a, 108b the current owner 408 for the LUNs 328 that it is the preferred owner 412.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A storage controller comprising:
    a memory storing an indication of a current owner, a previous owner, and a preferred owner for each of one or more logical volumes,
    the storage controller configured to:
        write protect the logical volumes where the current owner and the preferred owner is the storage controller and the previous owner of the logical volumes was a different storage controller;
        for the logical volumes where the storage controller is the preferred but not the current owner:
            setting the storage controller as the current and preferred owner of the logical volumes that the different storage controller was the current but not the preferred owner for, setting the storage controller as the previous owner of the logical volumes that the storage controller is the current and preferred owner of, and allowing read and write access to the one or more logical volumes.

2. The storage controller of claim 1, wherein if the storage controller is the previous owner, current owner, and preferred owner of one of the logical volumes, the storage controller forgoes write protecting the one of the logical volumes and makes the one of the logical volumes available over a host interface.

3. The storage controller of claim 1, wherein for the logical volumes where the storage controller is the current but not the preferred owner, the storage controller transfers write cache data to the different storage controller, changes the current owner to the different storage controller, and sends a notification to the different storage controller.

4. The storage controller of claim 3, wherein prior to the storage controller transferring write cache data to the different storage controller, the storage controller provides a notification of host interface path changes involving the storage controller and the different storage controller.

5. The storage controller of claim 3, wherein the logical volumes are controlled by a pair of redundant storage controllers comprising the storage controller and the different storage controller, wherein each instance of the current owner, previous owner, and preferred owner comprises an identifier that uniquely identifies one of the storage controller and the different storage controller.

6. The storage controller of claim 5, wherein the storage controller becoming the current and preferred owner of the logical volumes that the different storage controller was the current but not the preferred owner for comprises:
    the storage controller setting the current owner and preferred owner identifiers to a serial number identifying the storage controller.

7. The storage controller of claim 5, wherein if the storage controller cannot communicate with the different storage controller, the storage controller becomes the current owner of the one or more logical volumes where the different storage controller is the current owner and write protects the logical volumes where the current owner and the preferred owner is the storage controller and the previous owner of the one or more logical volumes was the different storage controller.

8. The storage controller of claim 7, wherein less than all of the logical volumes are write protected where the current owner and the preferred owner is the storage controller, the storage controller becomes the previous owner of the one or more logical volumes where the current owner is the storage controller, removes a write protect indication for the one or more logical volumes that are write protected and the storage controller is the current owner, and makes the one or more logical volumes available over a host interface.

9. A method comprising:
write protecting, by a first storage controller, one or more-logical volumes if a previous owner of the one or more logical volumes was a second storage controller;
for the one or more logical volumes where the first storage controller is a preferred owner but not a current owner:
after receiving a notification from the second storage controller, the method comprising:
becoming, by the first storage controller, the current and preferred owner of the one or more logical volumes that the second controller was the current but not the preferred owner for;
becoming the previous owner of the one or more logical volumes that the first storage controller currently owns; and
allowing read and write access to the one or more logical volumes by one or more host computers.

10. The method of claim 9, wherein if a previous owner of the one or more logical volumes was the first storage controller, the method further comprising:
forgoing write protecting the one or more-logical volumes; and
making the one or more logical volumes available to host computers for logical volumes where the first storage controller is the current and previous owner.

11. The method of claim 9 wherein write protecting one or more-logical volumes comprises blocking write accesses to the one or more logical volumes.

12. The method of claim 9, further comprising:
for the one or more logical volumes where the first storage controller is the current but not the preferred owner, the method further comprises:
transferring, by the first storage controller, write cache data to the second storage controller;
changing the current owner to the second storage controller; and
sending a notification to the second storage controller.

13. The method of claim 12, wherein prior to transferring the write cache data, the first storage controller notifies one or more host computers of path changes for the one or more logical volumes corresponding to the current owner for each of the one or more logical volumes.

14. The method of claim 12, wherein the one or more logical volumes are controlled by a pair of redundant storage controllers comprising the first and second storage controllers, wherein the current owner identifies one of the first and second storage controllers that host computers use to access a corresponding logical volume, wherein the previous owner identifies one of the first and second storage controllers that host computers used to access the corresponding logical volume prior to the current owner, wherein the preferred owner identifies one of the first and second storage controllers that a user or system administrator wishes to own the corresponding logical volume under normal operating conditions.

15. The method of claim 14, wherein the method occurs as part of a boot process of the pair of redundant storage controllers, wherein prior to write protecting, the method comprises:
determining, by each storage controller of the pair of redundant storage controllers, the current owner, previous owner, preferred owner, and write protection status, for each of the one or more logical volumes.

16. The method of claim 15, wherein the first storage controller performs the actions of the second storage controller, wherein the second storage controller performs the actions of the first storage controller.

17. A system comprising:
one or more logical volumes; and
first and second storage controllers coupled to the one or more logical volumes each storage controller configured to:
write protect logical volumes if a current owner and a preferred owner is one of the first and second storage controllers and a previous owner of the logical volumes is another of the first and second storage controllers;
for logical volumes where one of the first and second storage controllers is a preferred owner but not a current owner:
setting one of the first and second storage controllers as the current and preferred owner of the logical volumes that the other of the first and second controllers was the current but not the preferred owner for;
becoming the previous owner of the logical volumes that the one of the first and second storage controllers currently owns; and
allowing read and write access to the logical volumes.

18. The system of claim 17, wherein if the previous owner of one of the logical volumes was one of the first and second storage controllers, the one of the first and second storage controllers forgoes write protecting the logical volumes and makes the logical volumes available over a host interface for logical volumes where one of the first and second storage controllers is the current and previous owner.

19. The system of claim 17, wherein if the first storage controller cannot communicate with the second storage controller, the first storage controller becomes the current owner of the logical volumes where the second storage controller is the current owner and write protects the logical volumes where the current owner and the preferred owner is the first storage controller and the previous owner of the logical volumes was the second storage controller.

20. The system of claim 17, wherein during a boot process of the storage controllers, prior to write protecting, the system determines the current owner, previous owner, preferred owner, and write protection status for each of the logical volumes.

* * * * *